(12) United States Patent
Hui

(10) Patent No.: US 11,319,813 B2
(45) Date of Patent: May 3, 2022

(54) TAPERING SPIRAL GAS TURBINE WITH POLYGON ELECTRIC GENERATOR FOR COMBINED COOLING, HEATING, POWER, PRESSURE, WORK, AND WATER

(71) Applicant: MONARCH POWER TECHNOLOGY (HONG KONG) LIMITED, Hong Kong (CN)

(72) Inventor: Joseph Y. Hui, Fountain Hills, AZ (US)

(73) Assignee: MONARCH POWER TECHNOLOGY (HONG KONG) LIMITED, Hong Kong (CN)

( * ) Notice: Subject to any disclaimer, the term of this patent is extended or adjusted under 35 U.S.C. 154(b) by 790 days.

(21) Appl. No.: 15/548,349

(22) Filed: Aug. 2, 2017

(65) Prior Publication Data
US 2018/0119548 A1    May 3, 2018

Related U.S. Application Data

(63) Continuation-in-part of application No. PCT/CN2016/105462, filed on Nov. 11, 2016, and a continuation-in-part of application No. PCT/IB2016/001359, filed on Jul. 5, 2016.
(Continued)

(51) Int. Cl.
*F01D 1/22* (2006.01)
*F02C 3/16* (2006.01)
(Continued)

(52) U.S. Cl.
CPC .............. *F01D 1/22* (2013.01); *B01D 1/00* (2013.01); *B01D 1/0035* (2013.01); *B01D 3/007* (2013.01);
(Continued)

(58) Field of Classification Search
CPC ... F01D 1/22; F01D 1/32; F01D 5/043; F02C 3/16
See application file for complete search history.

(56) References Cited

U.S. PATENT DOCUMENTS

2005/0025640 A1* 2/2005 Sekiguchi ............... F04D 29/30
                                                      417/423.4
2007/0003414 A1* 1/2007 Harman .................. F04D 29/30
                                                      415/206
(Continued)

*Primary Examiner* — Todd E Manahan
*Assistant Examiner* — Rodolphe Andre Chabreyrie
(74) *Attorney, Agent, or Firm* — Bycer & Marion, PLC; Matthew L. Bycer; Michael B. Marion

(57) ABSTRACT

A tapering exponential spiral for a gas expander for work extraction or air cooling. A gas compressor to increase the pressure and temperature of air. The compressor-expander forms a single and simple structure.
A generator with a disk format using a circle of alternating polarity magnets to induce current in polygon solenoids.
A heat turbine, Firefly Electric, is small, simple, and efficient heat engine.
A heat pump, Firefly Air, for cooling, refrigeration, water capture, and heating. Solar power can be generated and stored as compress air.
A water purifier, Firefly Aqua, to desalinate water by solar power. Sunlight is concentrated by a sun tracking conic reflective surface onto a column of salty water. Solar photovoltaic power can be used to power a spiral compressor to condense low pressure steam. Also, we reuse solar heat by extracting the heat of compressing and condensing steam for evaporating more salty water under reduced pressure.

11 Claims, 12 Drawing Sheets

Related U.S. Application Data

(60) Provisional application No. 62/460,264, filed on Feb. 17, 2017, provisional application No. 62/290,393, filed on Feb. 2, 2016.

(51) Int. Cl.
*F01D 1/32* (2006.01)
*C02F 1/14* (2006.01)
*B01D 3/00* (2006.01)
*B01D 1/00* (2006.01)

(52) U.S. Cl.
CPC ............... *C02F 1/14* (2013.01); *F01D 1/32* (2013.01); *F02C 3/16* (2013.01); *Y02B 30/52* (2013.01); *Y02E 20/16* (2013.01)

(56) References Cited

U.S. PATENT DOCUMENTS

| | | | |
|---|---|---|---|
| 2010/0158667 A1* | 6/2010 | Helmer | F04D 17/168 415/97 |
| 2010/0158672 A1* | 6/2010 | Helmer | F04D 17/168 415/120 |
| 2011/0164958 A1* | 7/2011 | Saitoh | F01D 1/36 415/1 |
| 2012/0076656 A1* | 3/2012 | Abass | F03B 3/121 416/176 |
| 2014/0252772 A1* | 9/2014 | Hui | F01D 1/32 290/52 |
| 2016/0376894 A1* | 12/2016 | Van Asten, II | F03B 17/061 416/243 |
| 2017/0067343 A1* | 3/2017 | Maugh | F02C 3/165 |

* cited by examiner

Fig. 1 A tapering exponential spiral (top), expander with anticlockwise spirals rotating clockwise (bottom left), and compressor with clockwise spirals rotating clockwise (bottom right)
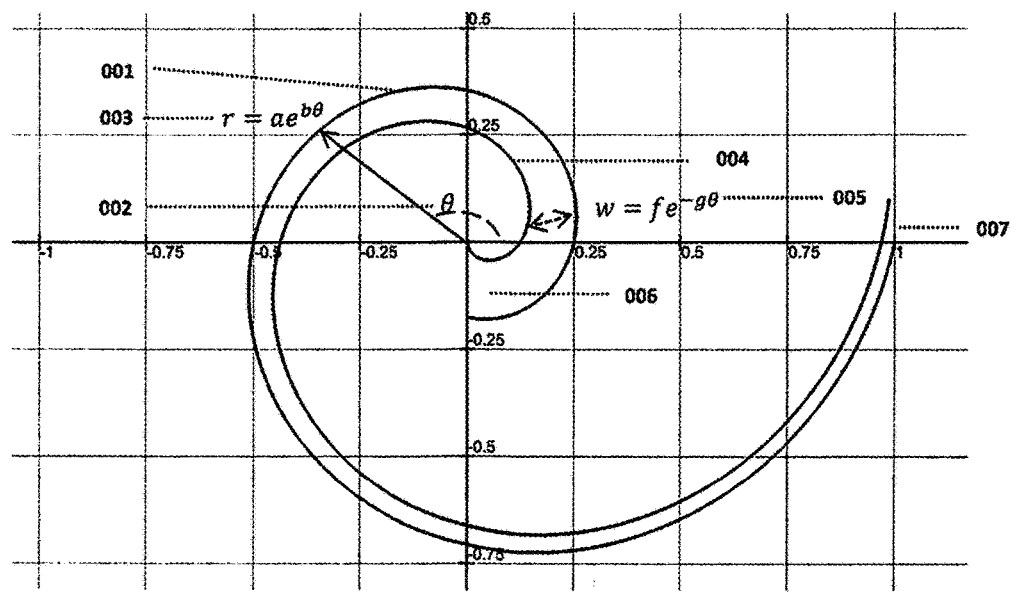
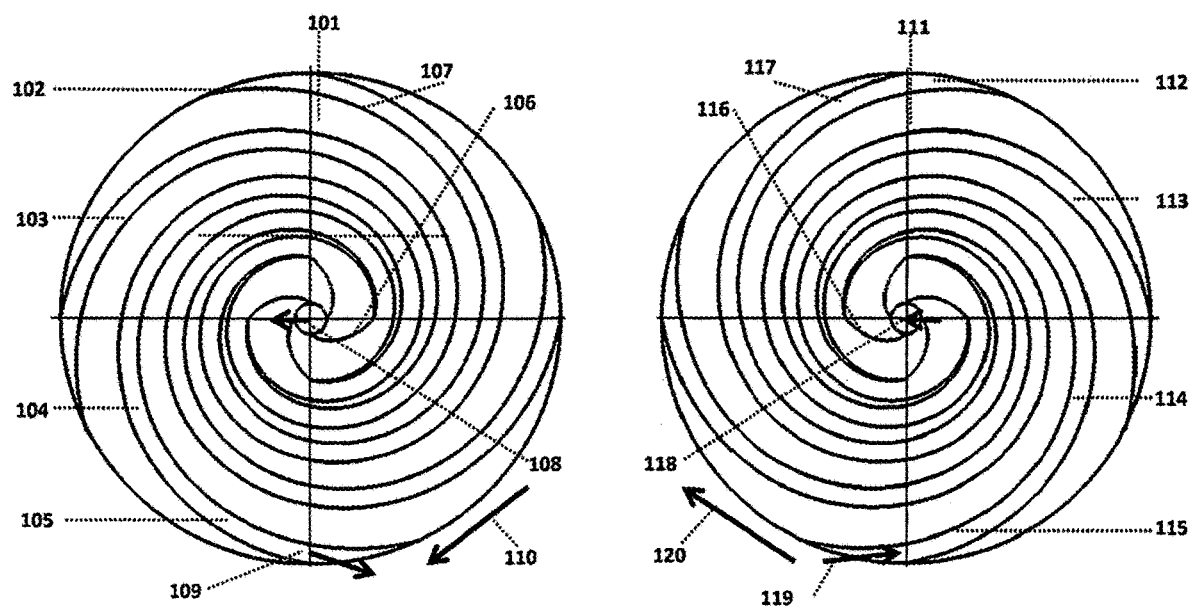

Fig. 2 Gas temperature drop ratio $T/T_0$ versus radius $r$ (top) for the Brayton cycle (bottom)
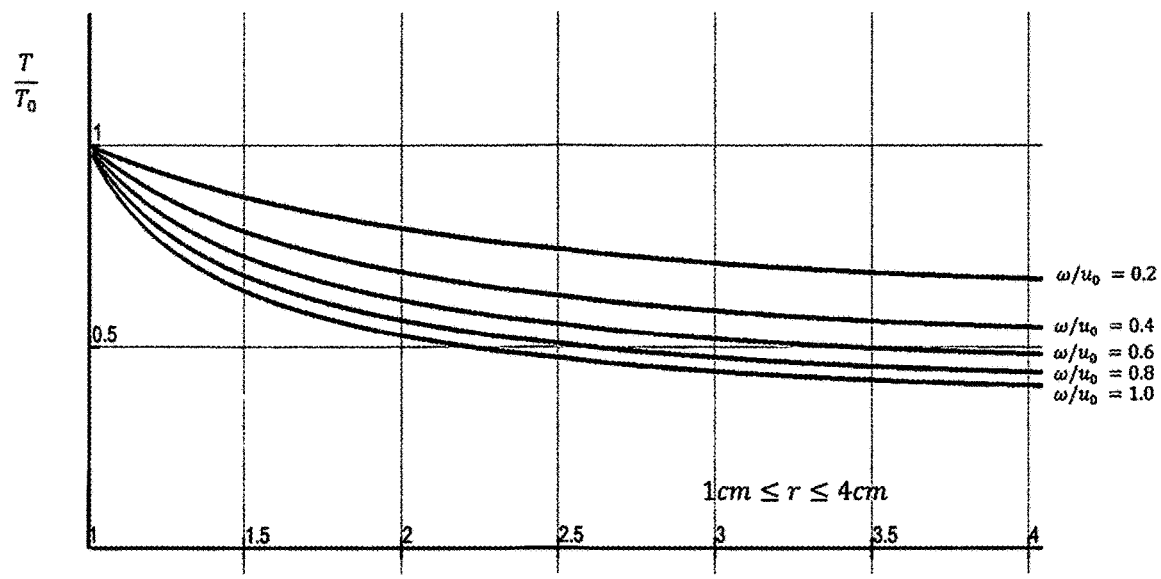
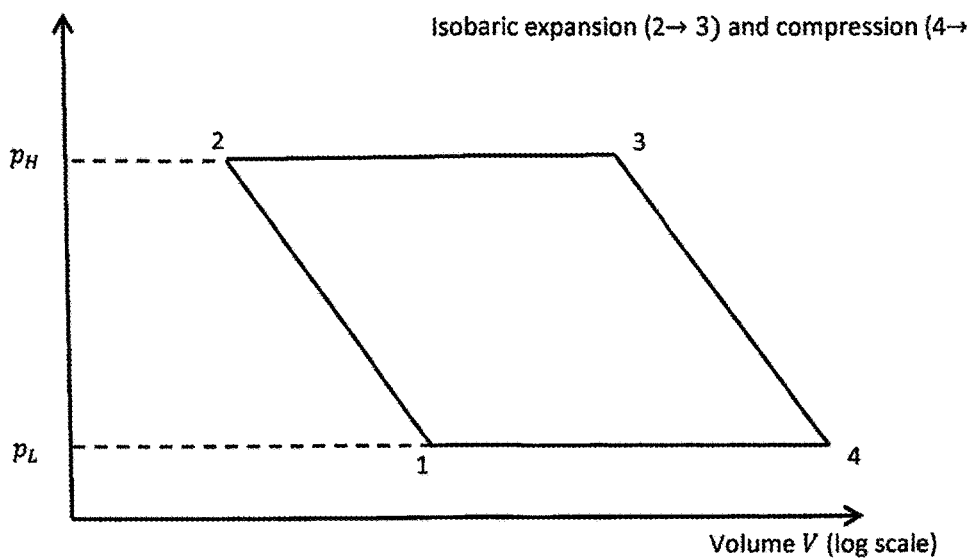

Fig. 3 Gas compression ratio $p_0/p$ versus radius $r$ (top) for the Hui cycle (bottom)
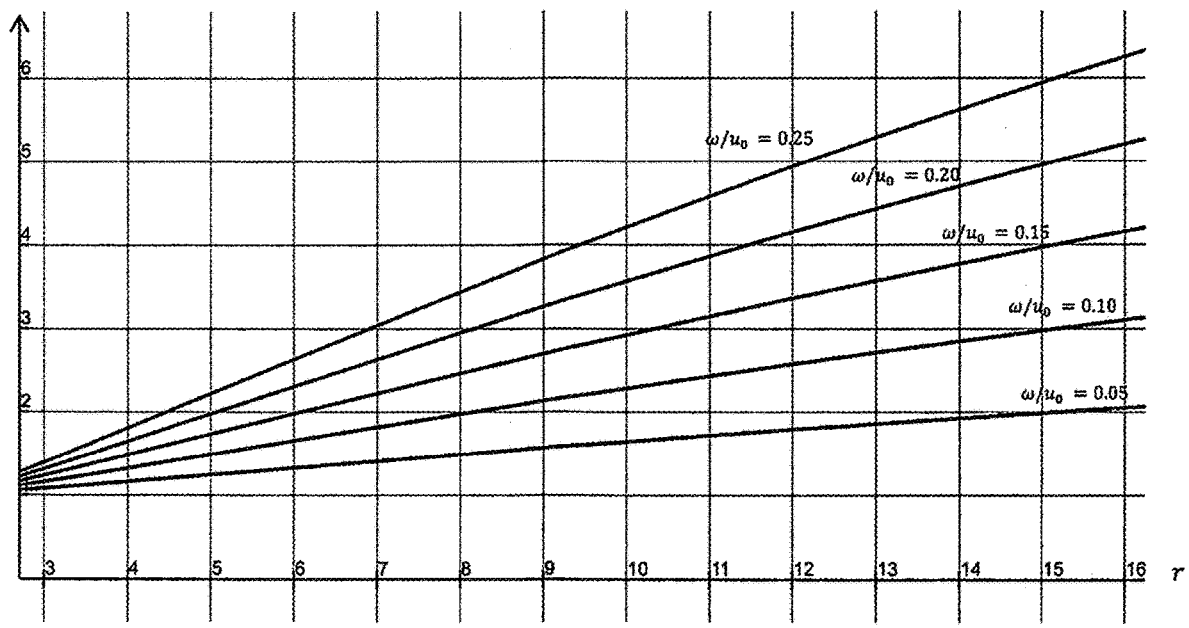
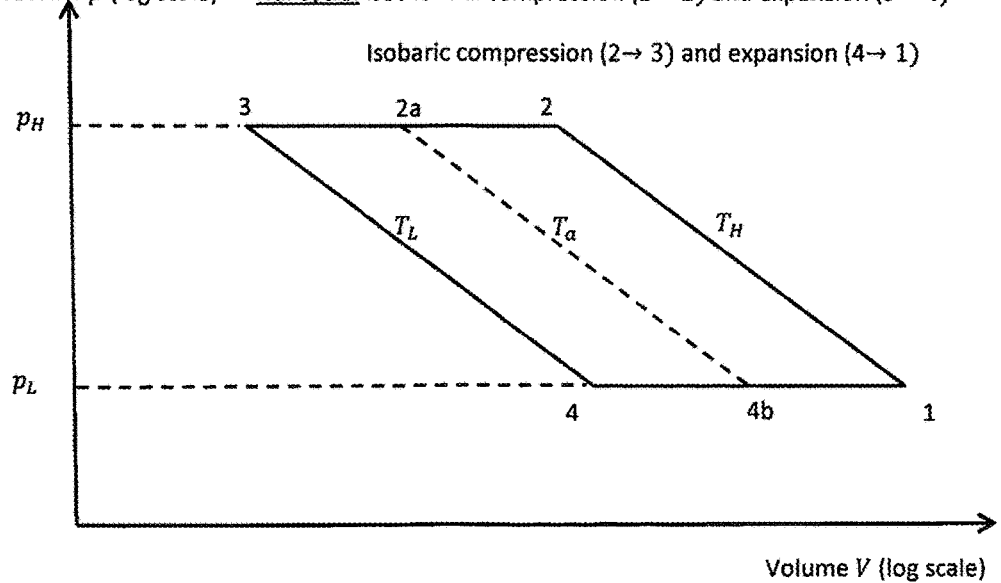

Fig. 4 Polygon electric generator (Fig. 4a), polygon induction motor (Fig. 4b), rectangular electric generator (Fig. 4c), and polygon transducer for frequency and voltage (Fig. 4d)

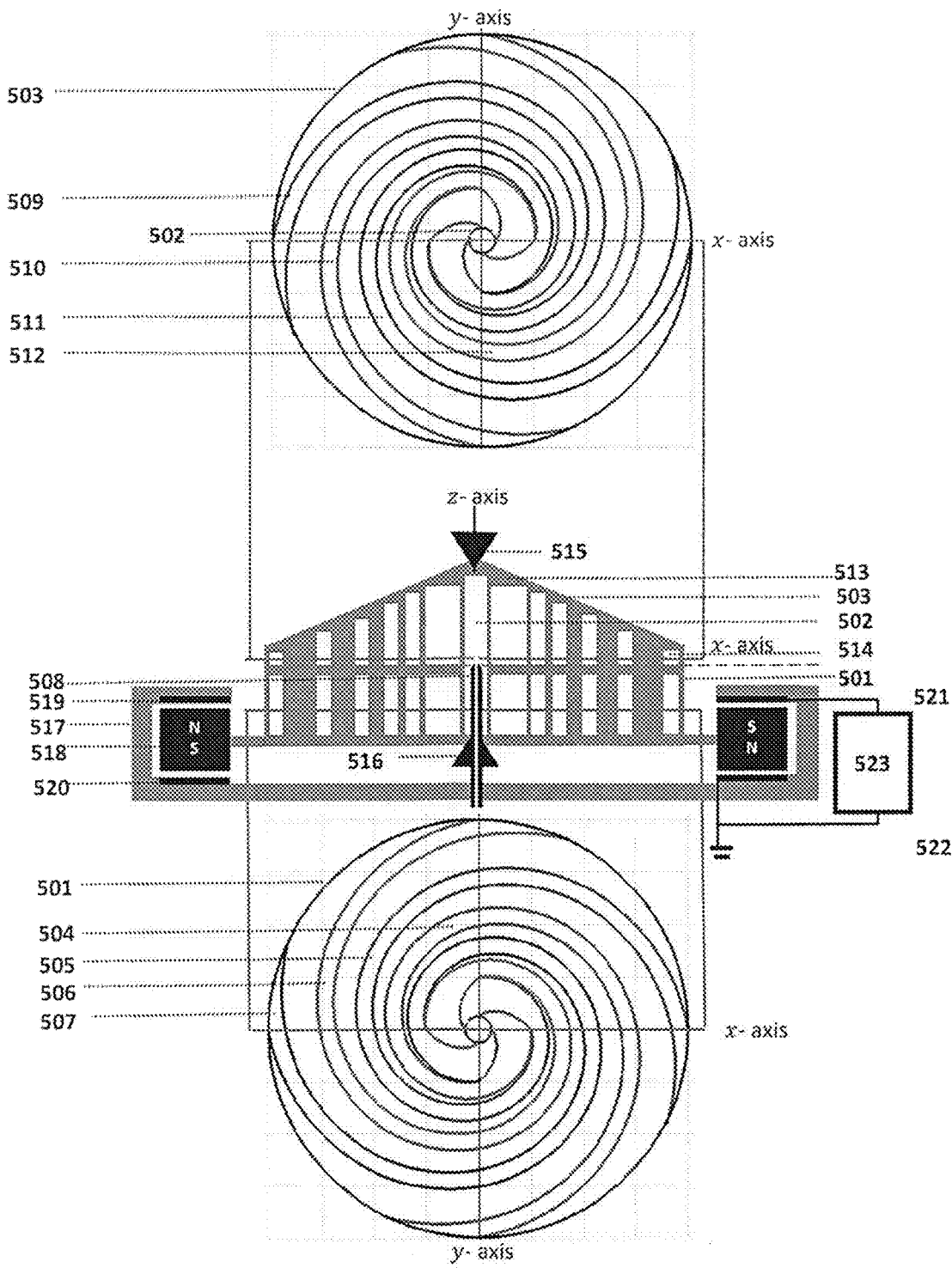
Fig. 5 Vertical view of turbine and generator cross section (center) and horizontal cross section views of expander (top spiral disk) and compressor (bottom spiral disk)

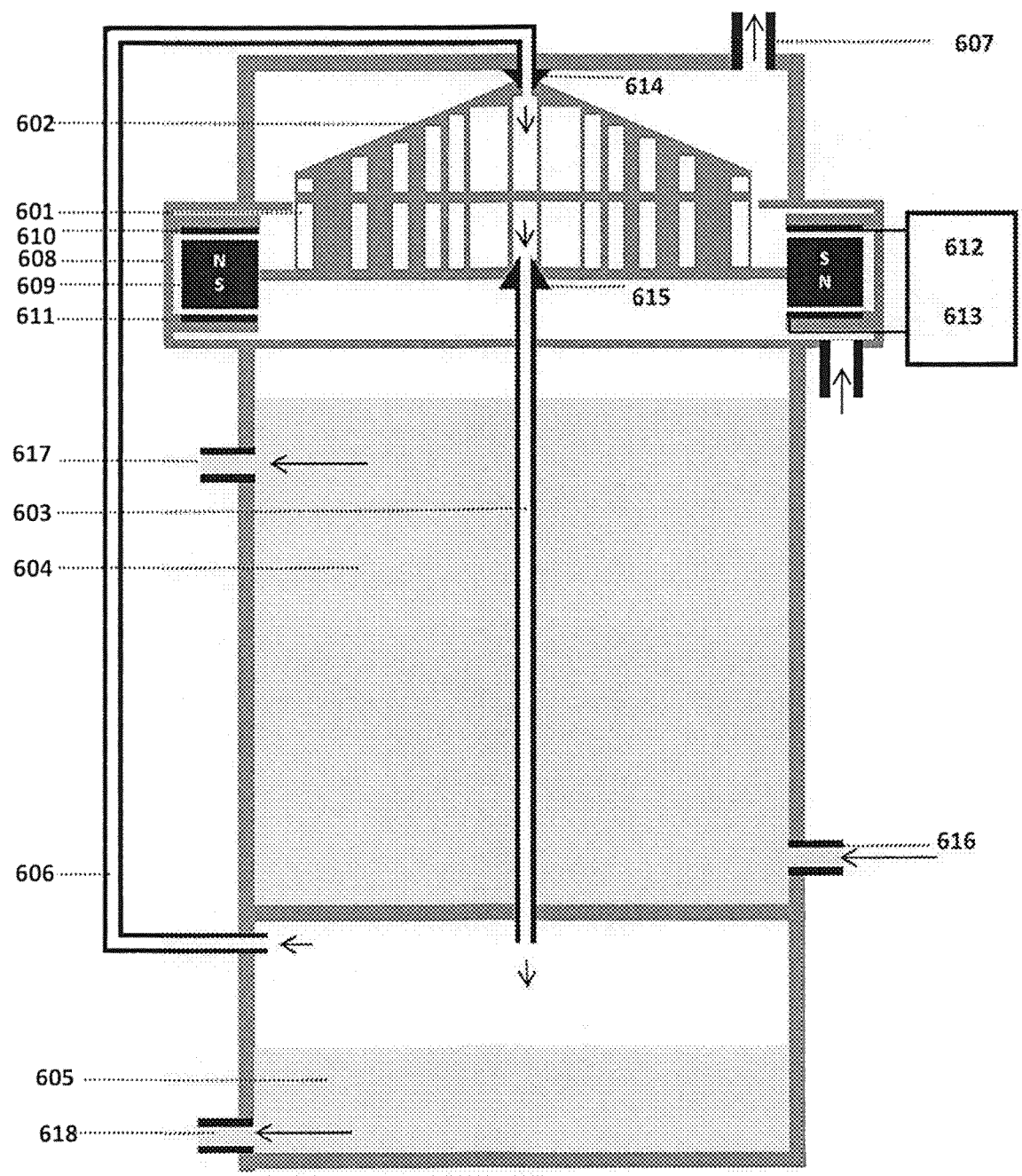
Fig. 6 Cross section view of a heat pump for heating water and air conditioning

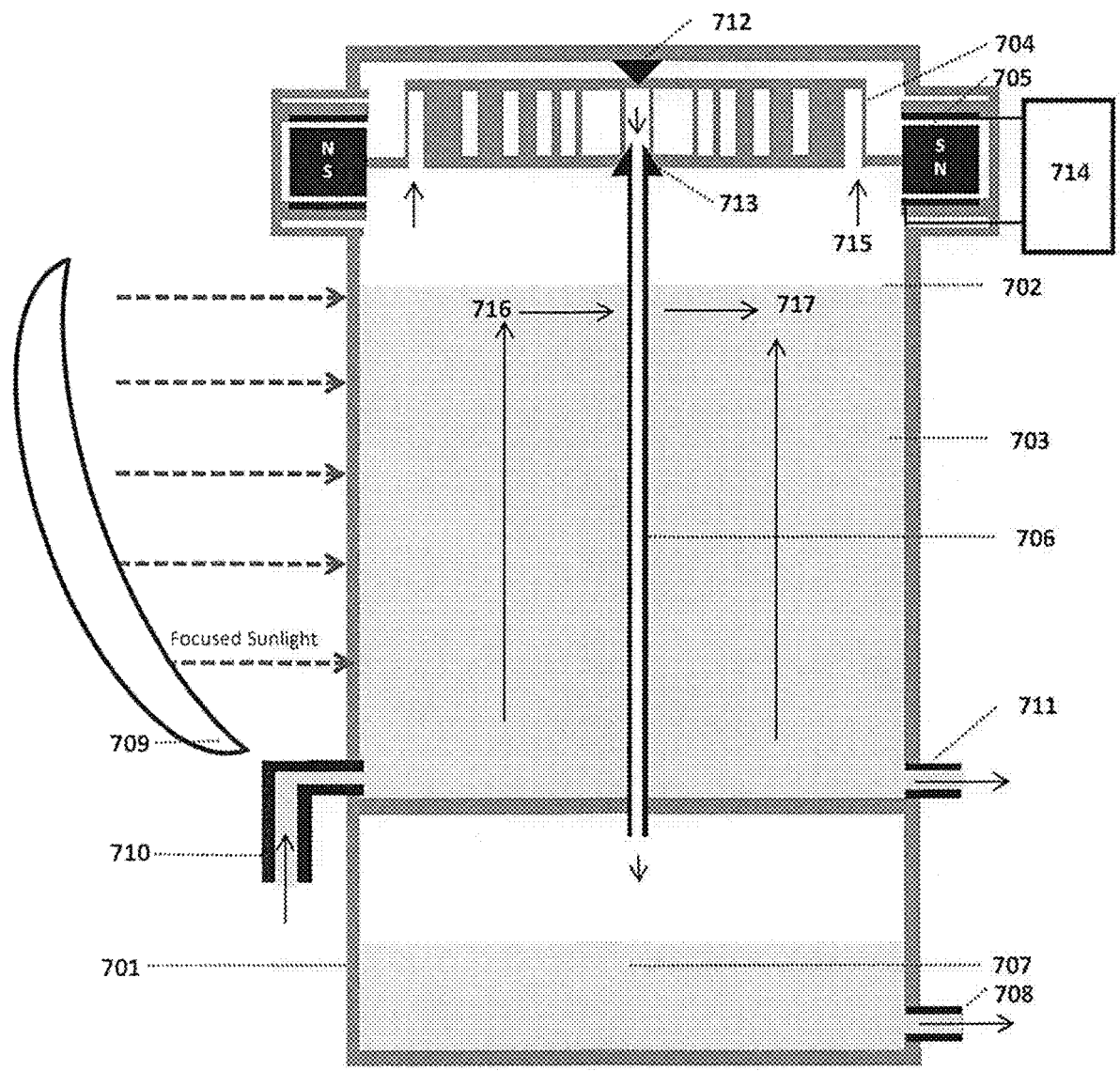
Fig. 7 Cross section view of a solar powered desalination system using spiral compressor

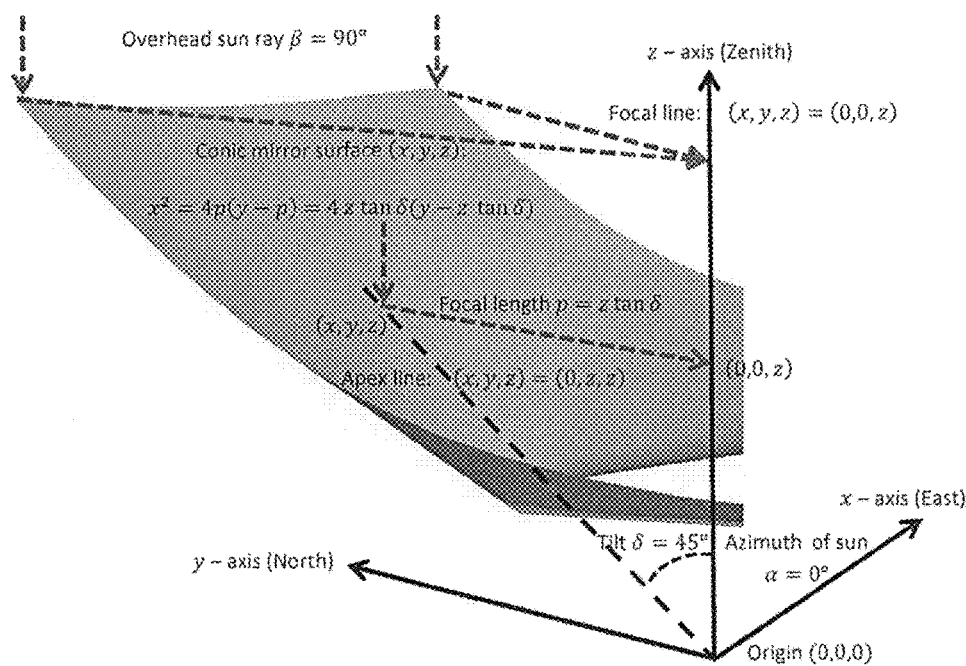
Fig. 8 A conic mirror concentrating sunlight onto a water column at the focal line Fig. 9 A scrolling compressor in open (when spirals are closest together, top picture) and closed positions (when spirals are farthest apart, bottom picture)
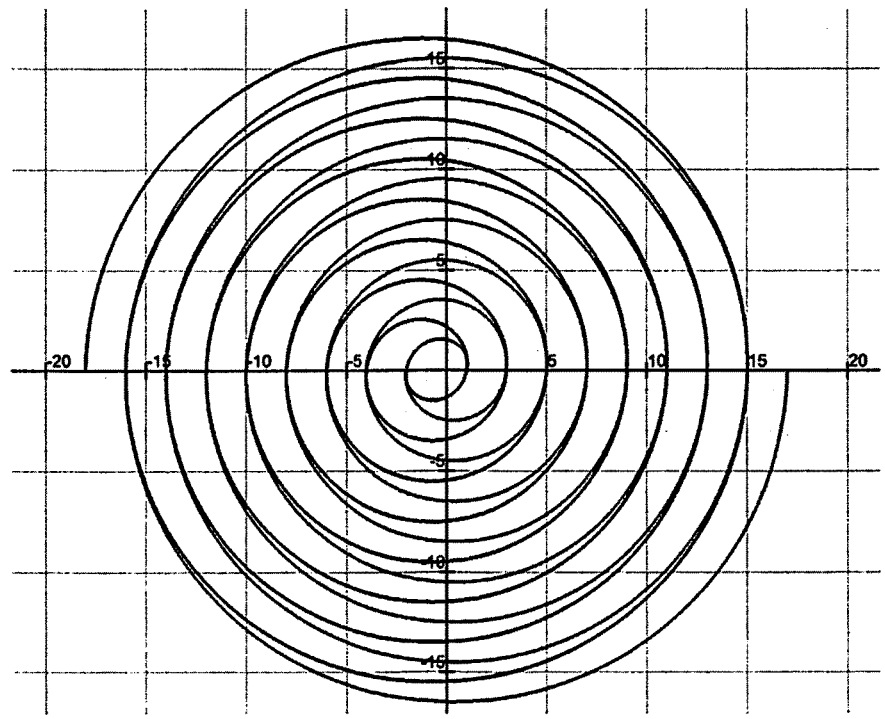
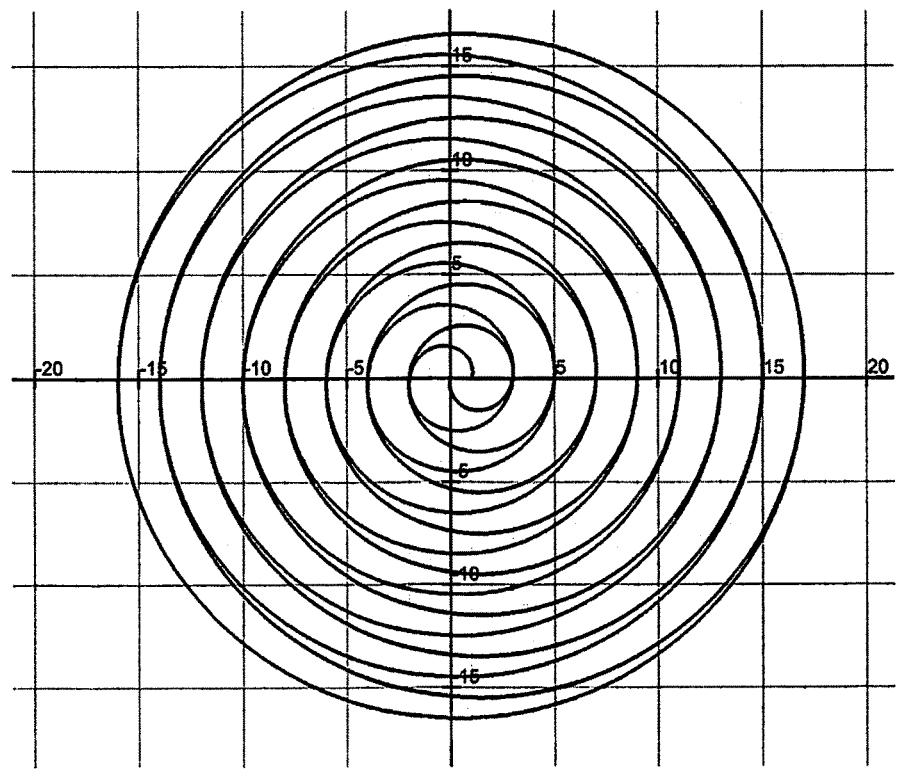

TAPERING SPIRAL GAS TURBINE WITH POLYGON ELECTRIC GENERATOR FOR COMBINED COOLING, HEATING, POWER, PRESSURE, WORK, AND WATER

CROSS REFERENCE TO RELATED APPLICATION

The present application includes subject matter disclosed in and claims priority to a provisional application entitled "A Tapering Spiral Gas Turbine for Combined Cooling, Heating, Power, Pressure, Work, and Water" filed Feb. 2, 2016 and assigned Ser. No. 62/290,393 describing an invention made by the present inventor, with improvements disclosed to the Patent Cooperation Treaty Application Numbers PCT/IB2016/001359 filed on Jul. 5, 2016, and PCT/CN2016/105462 filed on Nov. 11, 2016. The subject entitled "Polygon Electric Generator" was filed Feb. 27, 2017 and assigned Ser. No. 62/460,264.

BACKGROUND OF INVENTION

The world needs clean air, water, food, energy, and transportation that is accessible and equitable to all, not just for the developed countries. Key to universal provisioning of these amenities is technological advances that meet these needs of people where they are, supported by energy sources that are local and affordable, such as solar power and bottled liquid petroleum gas.

We are facing global climate change due to the burning of fossil fuel causing global warming and rising of sea level. Burning coal creates air pollution. Ground water is rapidly depleted. Global warming brings extreme heat, requiring more air conditioning that uses more global warming fossil fuel. Transportation requires expensive petroleum product, causing chronic particulate pollution.

To mitigate energy shortage and climate change, we emphasize three shift of focus. The first shift of focus is from energy generation to energy application. Energy generation is just a mean to the end comforts of clean air, water, food, and transportation. Energy conservation often brings more comfort.

The second shift of focus is from electricity to heat. We can use heat directly for space and water heating, and indirectly to generate cooling, water, cooking, motion, and then motion-induced electricity. Electricity is generated for lighting, communication, computation, and electric transportation.

We should store energy close to the form it is used: heat energy in heat bath, pressure energy as pressurized gas, chill as condensed refrigerant or frozen matter, and electrical energy in chemical batteries. If small and efficient turbines are available, we should store chemical energy as fuel.

The third shift of focus is local generation, storage, conversion, and use of energy. We want to reverse the Edison utility model of centralized generation (CG) of electricity with grid distribution.

We invented technologies that integrate a disk micro-turbine with a disk generator. We call that Firefly technology, which is personal yet as efficient as large power plants. CG becomes unnecessary and is replaced by Personal Energy (PE) for mobile collection, storage, conversion, and use of energy.

PE replacing CG brings us full circle in 4 phases of industrial revolutions. The $1^{st}$ revolution centralized work production by large steam engines. The $2^{nd}$ revolution electrified the world with large AC generators driven by steam engines. The $3^{rd}$ revolution of micro-electronics gave us global computing and communication networks. The $4^{th}$ revolution of MEMS (Micro-Electronic-Mechanical Systems) reverses the $1^{st}$ and $2^{nd}$ revolutions of CG to give us PE, making all things local, small, and personal.

Firefly gives Combined Cooling, Heating, Power, Pressure, Work, and Water (acronym $CCHP^2W^2$).

Firefly can help industrialize poor countries, allowing people to be productive where they are without electric or water grids. Half of the world lives without reliable electricity or running water supply.

Key to $CCHP^2W^2$ is an efficient micro-turbine powered by concentrated solar power or internal combustion of gaseous fuel. Integrated with the micro-turbine is an efficient micro motor-generator.

Let us survey the history of heat engines and electric generators. Hero of Alexandria invented the first heat turbine 2000 years ago. Steam produced in a boiler was ejected through nozzles in opposing directions, turning the hinged boiler. The Hero turbine was a curiosity exhibited in the Alexandria Library.

In between Hero and the $1^{st}$ industrial revolution, wind and water motion energy were harvested by means of turbines, literally a rotating device such as a wind mill or a water mill. Blades or buckets obstruct wind or flowing water, spinning the turbine to extract mechanical work.

The first powerful and practical steam engine was patented by James Watt in 1769. Steam from coal fired boiler drives a piston in a cylinder to give a significant force for pumping water, weaving textile, and driving train. Steam driven locomotives brought people to cities. Centralized manufacturing was driven by steam engines. These Rankine cycle heat engines boil a liquid to create pressure to do work.

Stirling engine was patented by Reverend Stirling in 1816. He was concerned with the deadly pressure of steam boilers. Stirling engines use two cylinders, one for heating air and another for cooling air. Expanding air performs work. These Carnot cycle heat engines operate at high temperature.

Around 1830, Michael Faraday invented the homopolar disk generator. Electric current is collected from the perimeter of a rotating disk sandwiched between poles of a C-shaped magnet. Lossy eddy current flows within the rotating disk. Despite improvements such as that by Nikola Tesla, this generator was not used for utility power generation due to low efficiency and voltage.

Inventions of Edison and Tesla created the power utilities in the early $20^{th}$ century. Coal fired steam engines generate electricity by Tesla's AC generators. Steam engines are large and inefficient. They are strong but slow. To generate large current, AC generators require large electromagnets.

Nikola Tesla invented the 3 phase electricity generator with mutual induction of current in stator and rotor coils. Ease of voltage conversion allows efficient high voltage transmission of electricity over long distance electric grid with much reduced ohmic loss of power. Power utilities adopt AC over DC.

Nikola Tesla also invented the Tesla turbine. The turbine comprises a stack of closely spaced disks. Steam is injected tangentially on turbine periphery. Steam spirals inward in between disks towards the center of the stack. Steam drags disks by gas viscosity. Tesla claimed to achieve 90% isentropic efficiency of theoretical Carnot cycle efficiency, which is not verified even with today's technologies.

Since 1950, gas and steam turbines have made power utilities much more efficient. Steam turbines powered by steam generated by burning coal have efficiency around 40%. Large amount of water is required to condense low pressure steam from the steam turbine. Combined cycle gas turbine (CCGT) achieves efficiency above 60%. CCGT uses natural gas to drive a Brayton cycle gas turbine. Hot gas exhaust generates steam to power a Ranking cycle steam turbine.

Since the 21$^{st}$ century, the world confronts pollution from burning fossil fuel. The resulting climate change is threatening human survival. Yet much of the world population remains poor for being served water, heat, chill, food, and transportation. CG is failing poor countries that lack power infrastructure. Yet poor people suffer the most from global warming, rising sea levels, and chronic air pollution.

Burning more coal is not the answer to help people live a comfortable life. We cannot afford to build expensive, polluting, and wasteful infrastructure of energy collection, generation, and distribution. Natural gas and solar power are our energy source of choice for PE. Both are abundantly available for personal energy generation and use. PE is efficient, clean, local, small, useful, and therefore beautiful.

To solve the energy and environmental crises, we have to personalize energy production, storage, conversion, and usage. We will focus on heat, as our energy source. Heat can come from solar thermal, geothermal, or from burning of piped natural gas and propane transported in canisters.

Our goal is to make small gas turbines as efficient as large gas turbines, at a small fraction of cost per Watt of power. We want cogeneration of heat, chill, water, and work besides electricity.

We investigate the geometry of open gas flow in spiral gas channels that allows gradual release of gas pressure to produce work. We want to avoid a sudden conversion of pressure into kinetic energy of the gas by means of a tapering exponential spiral. The same spiral gas channel rotating in a reversed direction can also be used as a gas compressor, increasing the pressure and temperature of gas.

We investigate the geometry for electricity generation with modern magnetics and electronics. Most electric generators and motors are polar in the sense of having multiple magnetic poles in the stator interacting with multiple magnetic poles in the rotor. We assume a distinctly different geometry of a polygonal winding without poles. The polygon corners include a varying amount of magnetic flux as the polygon rotates in the circle of magnets of alternating polarity. An electric voltage is induced in the polygon solenoid per Faraday's induction law that induced voltage is the rate of change or included flux.

We propose three applications based on our invention of micro-turbine and micro-generator. First, we describe a heat turbine that integrates the spiral compressor, the spiral expander, and our electric generator. This heat engine called Firefly Electric generates work and electricity.

This micro-turbine can be used to drive cars, directly powering the drive train or indirectly with its electricity generated. The turbine can be modified as a turbo charger for automobile piston engines, using tailpipe exhaust to turn a spiral expander which then drives a spiral compressor to increase engine pressure. Firefly Electric can also be used to fly drones. It can power homes by solar and gas energy.

The second application is a heat pump of a spiral compressor of air driven by our electric motor to compress air. Heat of compression is used to heat water. Compressed air when cooled gives out water. Compressed air when expanded gives dry and cool air for air conditioning and refrigeration. Expansion of compressed gas can produce work for generation of electricity. The technology is called Firefly Air.

The third application is a solar powered water desalination system called Firefly Aqua. We track the position of the sun, concentrating sunlight by a conic reflective surface onto a cylindrical water tank. Solar energy boils salty water under reduced pressure. Solar energy drives our spiral compressor to condense steam. Firefly Aqua has high efficiency as heat of compression and condensation is reused to evaporate more salty water.

SUMMARY OF INVENTION

The exponential spiral tapering outwardly is an effective geometry for gas flow for the conversion of the internal energy of pressurized and hot gas into motion energy. We solved the temperature and pressure drop of adiabatic gas flow in the spiral outwardly, pushing the turbine to yield motion energy.

The same exponential spiral tapering inwardly when turned in reversed rotational direction can be an effective geometry for compression of gas, converting motion energy into pressurized and heated gas. We solved the pressure gain of gas by the spiral wall pushing gas toward the center.

We invent an electric generator based on the relative rotational motion between a circular set of axially magnetized magnets of alternating polarity with a polygonal solenoid. The magnetic flux of the magnets through the polygonal solenoid changes as a sinusoid with relative motion between stator and rotor of the generator. This changing magnetic flux induces an electric potential between the two ends of the solenoid, thus converting rotational power into alternating current (AC) power. The use of three triangular solenoids to form a nine-point star can generate three-phase AC electricity. These generators can also be used as motor generating motion from electricity. The circular magnets can also be replaced by a conductor disk, making an induction motor or generator. Cascade of motor-generator can be used as transducer of AC frequency and voltage.

We integrate the spiral compressor and spiral expander with the generator and motor for three applications. The first application called Firefly Electric is a heat turbine that can convert solar or gas combustion heat into work and electricity. This heat turbine and electric motor can drive vehicles such as cars, bus, trucks, trains, and small aircrafts. It can also be used to power and heat homes.

The second application called Firefly Air is a heat pump powered by a motor to compress humid air to higher temperature and pressure. The compressed air is cooled at room temperature to remove heat and humidity to produce heated water and moisture condensed potable water. Cooled and dried compressed air can expand in the spiral expander to yield work and cold air for air conditioning.

The third application called firefly Aqua is a solar water desalination system. Focused sunlight from a sun tracking conic surface heats salty water to boil at less than 100° C. in reduced pressure. Low pressure steam at head of the heated water column is compressed by the spiral compressor using solar power. Condensing higher pressure steam exchanges its heat of compression and condensation to further heat the salty water column, generating more low pressure steam for even more potable water. Potable water is collected at the bottom beneath the column of evaporating salty water.

BRIEF DESCRIPTION OF THE DRAWINGS

FIG. 1 A tapering exponential spiral (top), expander with anticlockwise spirals rotating clockwise (bottom left), and compressor with clockwise spirals rotating clockwise (bottom right)

FIG. 2 Gas temperature drop ratio $T/T_0$ versus radius r and the Brayton cycle FIG. 3 Gas compression ratio $p_0/p$ versus radius r and the Hui cycle FIG. 4 Polygon electric generator (FIG. 4a), polygon induction motor (FIG. 4b), rectangular electric generator (FIG. 4c), and polygon transducer for frequency and voltage (FIG. 4d)

FIG. 5 Vertical view of turbine and generator cross section (center) and horizontal cross section views of expander (top spiral disk) and compressor (bottom spiral disk)

FIG. 6 Cross section view of a heat pump for heating water and air conditioning FIG. 7 Cross section view of a solar powered desalination system using spiral compressor FIG. 8 A conic mirror concentrating sunlight onto a water column at the focal line FIG. 9 A scrolling compressor in open (when spirals are closest together, top picture) and closed positions (when spirals are farthest apart, bottom picture)

THE TAPERING EXPONENTIAL SPIRAL

Figure 4A:
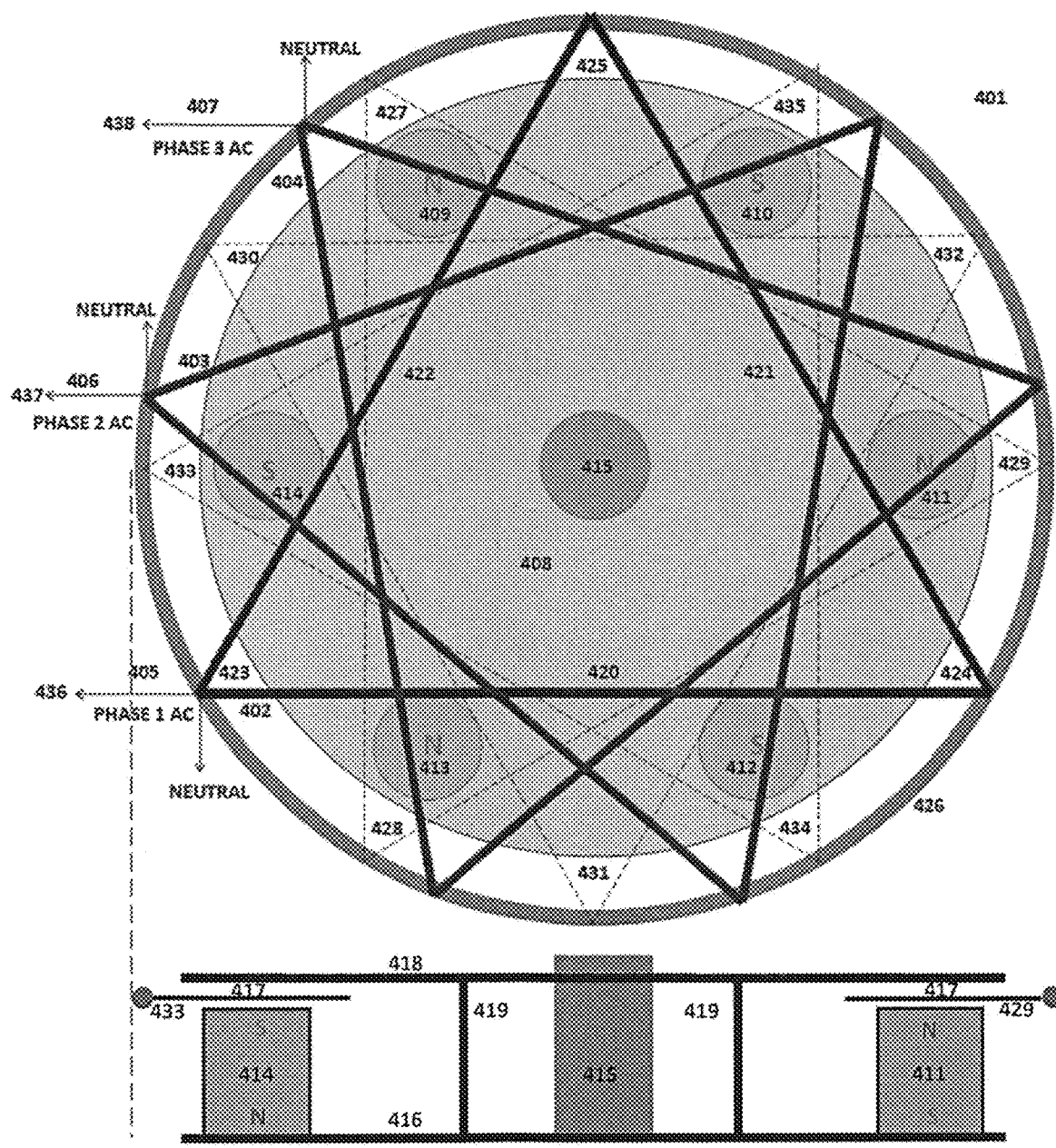

Traditional means to compress or expand a gas predominantly use two devices: pistons or fan blades. Gas is enclosed in a cylinder with a movable piston to compress or expand the gas. Gas can also be struck by high speed rotating blades for imparting or harvesting kinetic energy of gas.

We 3D printed turbines to find the appropriate geometry of spiral gas flow channel. We changed spiral size and shape. We tried the Archimedes spiral with radius $r=a\theta+b$ that increases linearly as turn angle $\theta$. Testing with pressurized gas showed that the Archimedes spiral did not work well.

We also tried the exponential spiral, also known as the Bernoulli spiral named after its inventor. Spiral radius $r=ae^{b\theta}$ increases exponentially as the angle $\theta$. We 3D printed a long and narrow exponential spiral with many turns, it spun well but created very little torque. By tapering an exponential spiral of shorter length as shown in FIG. 1, we generated significant torque.

Exponential spiral occurs often in nature such as seashells and plants. Fluid dynamics gives rise to an exponential spiral shape for hurricanes. Galaxy arms are exponential spirals. The exponential spiral results from the physics of growth. Growth is often self-generating and self-similar.

The exponential spiral is self-similar: the spiral looks similar as we zoom into the center of the spiral. A spinning Bernoulli spiral does not appear visually contracting or expanding.

This self-similarity is due to an important property of the Bernoulli spiral: spiral tangent makes a constant angle with spiral radius. Gas flowing in the Bernoulli spiral pushes against spiral wall at a constant angle. In contrast, the Archimedes spiral pushes against spiral wall with diminishing angle.

An eagle circles and zooms in on a prey in a similar manner. The eagle fixes its eye on the prey. The line of sight of the eagle towards the prey is at a fixed angle. Distance of eagle from prey decreases logarithmically as the eagle turns. This logarithmic spiral is the inverse of the exponential spiral.

Exponential spirals have radius $r=ae^{b\theta}$ where $\theta$ is the polar angle in radians. Logarithmic spirals have $$\theta = \frac{1}{b}\ln\frac{r}{a}.$$

We will use the relation $$\frac{dr}{d\theta} = abe^{b\theta} = br$$

for change of variable from $\theta$ to r. Spiral tangent makes a constant angle $$\alpha = \tan^{-1}\left(\frac{1}{b}\right)$$

with the radius. Spiral length from $r=a$ is $$x = \frac{(r-a)}{\cos(\alpha)}.$$

FIG. 1 shows a spiral with outside wall that is an exponential spiral. The width between the outside wall and the inside wall is shown to be tapering. Spiral channel width decreases exponentially as angle $\theta$. We will show that this tapering is key to retaining gas pressure without rapid speeding up of gas.

Temperature Change for Adiabatic Expansion of a Gas in a Tapering Spiral

Key to our invention is simple solution for gas temperature as gas expands adiabatically. In a tapering exponential spiral. This proves also a high thermal to motion energy conversion efficiency.

Early on, we experimented with pressurized air driving a long spiral of narrow constant width. The turbine was spinning fast but produced little torque. Torque force is important for work production.

Torque is produced by pressure force. To maintain better control of pressure release, we consider varying the bore area $A=wd$, the width w times depth d of the spirals. Gas speeds up due to its internal pressure gradient as dictated by Navier-Stokes equation. Tapering prevents gas speed up because of gas back pressure. We will show that this tapering moderates pressure release.

This large torque is due to first a larger area of the outside spiral wall than the inside wall and second a larger leverage due to difference in the wall radius from the center of the spiral.

A high pressure and hot gas moving inside the spiral has two main components of energy. The first component is gas internal energy due to heat, which is the chaotic motion of gas molecules.

The second component is gas kinetic energy, which is the systematic velocity of gas. At the center of the spiral where a high pressure gas is heated, gas internal heat energy is high. Gas velocity is low.

Most micro-turbine designs use a nozzle to release immediately gas pressure, converting the internal energy of gas instantaneously into kinetic energy. Gas cools rapidly. Post nozzle, the high speed gas rapidly becomes turbulent. High speed gas makes impact on turbine blades, producing very little torque force. Most kinetic energy of the gas is converted back into heat, not work.

We strive not to reduce gas pressure suddenly. We use pressure force of high temperature gas with retained pressure to produce a significant torque force at lower angular velocity of the turbine.

Gas kinetic energy density is $$\frac{1}{2}\rho v^2,$$

where $\rho$ is the mass density of the gas and $v$ its velocity. For $$\rho \sim 1 \text{ kg/m}^3 \text{ and } v = 100 \text{ m/s}, \frac{1}{2}\rho v^2 \sim 5{,}000 \text{ Pa} = 0.05 \text{ bar},$$

about 5% of atmospheric pressure.

Gas internal energy density is pressure $$p = \frac{nRT}{V}$$

according to ideal gas law. Our turbines operate at pressure beyond 10 bars. Thus gas pressure far exceeds kinetic energy density.

Bernoulli's law states $$p + \frac{1}{2}\rho v^2$$

is constant. For our turbine, pressure is converted to work before gas speeding up. We will ignore kinetic energy component in energy conservation consideration.

We consider torque produced by pressure acting on turbine walls. Torque is pressure p times spiral wall area $$\frac{r\delta\theta}{\sin\alpha}d$$

times the leverage $r \cos\alpha$ of the torque, where tan $$\alpha = \frac{1}{b}.$$

Net torque is the difference between the greater torque force on the outer wall of the channel than its inner wall.

Net torque between the outside and inside walls is $$\delta T_p = \left(p \times \frac{r\delta\theta}{\sin\alpha} \times d \times r\cos\alpha\right) - \left(p \times \frac{[r-w]\delta\theta}{\sin\alpha} \times d \times [r-w]\cos\alpha\right) = pbwd[2r - w]\delta\theta$$

For a turbine rotating at angular velocity $\omega$, this differential torque produces a differential power;

$$\frac{dT_p}{d\theta}\omega = pbwd[2r - w]\omega = pbA[2r - w]\omega$$

This derivation made the following assumptions. We ignored gas kinetic energy and viscosity of gas flow. We assume pressure force is expended as work rather than used to speed up gas. We also assume a constant pressure and velocity of gas across the radial width of the thin spiral channel.

We now consider power flow of gas inside the spiral. Consider the pressure energy component $P_f$ of gas flow. Pressure power flow across area A of a gas flowing with velocity u is $P_f = Aup$.

By conservation of energy, power loss $P_f$ is power gain by the turbine. Therefore $$\frac{dP_f}{d\theta} + \frac{dT_p}{d\theta}\omega = \frac{d}{d\theta}(Aup) + pbA[2r - w]\omega = 0$$

Conservation of mass flow implies constant Aup. Dividing above equation by Aup gives $$\frac{d}{d\theta}\left(\frac{p}{\rho}\right) + \left(\frac{p}{\rho}\right)\frac{\omega}{u}b[2r - w] = 0$$

Change of variable from $\theta$ to r using the relation $$\frac{dr}{d\theta} = br$$

gives:

$$\frac{d}{dr}\left(\frac{p}{\rho}\right) + \left(\frac{p}{\rho}\right)\frac{\omega}{u}\left[2 - \frac{w}{r}\right] = 0$$

From ideal gas law pV=nRT, we have $$\frac{p}{\rho} = \frac{nRT}{\rho V} = \frac{RT}{\rho V/n} = \frac{R}{m_w}T$$

Molar mass $m_w$ is the weight of a mole of gas. Thus $p/\rho$ measures the temperature T of gas.

With these substitutions, we obtain the remarkably simple differential equation $$\frac{dT}{dr} + T\frac{\omega}{u}\left[2 - \frac{w}{r}\right] = 0$$

The first term is heat energy loss of gas across the radius. The second term is work gain by turbine.

We assume that gas flow is adiabatic, implying constant. $TV^{\gamma-1}$. Gas volume V is proportional to Au of gas flow velocity it across area A. Thus $T(Au)^{\gamma-1} = T_0(A_0 u_0)^{\gamma-1}$, giving $$\frac{dT}{dr} + \omega \frac{T^{\gamma/(\gamma-1)}}{T_0^{1/(\gamma-1)}}\frac{A}{A_0 u_0}\left[2 - \frac{w}{r}\right] = 0$$

We choose A=wd with constant w and changing depth $$d = d_0 \frac{1 - cr}{1 - cr_0},$$

a linear tapering of depth versus radius r of the channel. Note $d=d_0$ for $r=r_0$. Since radius and length of the spiral channel increase exponentially as angle θ, channel depth d decreases exponentially as channel length $$x = \frac{(r-a)}{\cos(\alpha)}.$$

With this channel geometry we obtain the differential equation $$\frac{T^{-\gamma/(\gamma-1)}}{T_0^{-1/(\gamma-1)}} dT = -\omega \frac{d}{d_0 u_0}\left[2 - \frac{w}{r}\right]dr = -\frac{\omega}{(1-cr_0)u_0}\left[2 + cw - 2cr - \frac{w}{r}\right]dr$$

The initial condition is by $T=T_0$ when $r=r_0$. The solution of the differential equation is $$T = T_0\left\{1 + \frac{1}{\gamma-1}\frac{\omega}{(1-cr_0)u_0}\left[(2+cw)(r-r_0) - c(r^2 - r_0^2) - w\ln\frac{r}{r_0}\right]\right\}^{-(\gamma-1)}$$

FIG. 2 is a plot of temperature $T/T_0$ dropping across turbine versus radius $r_0=1$ cm≤r≤$r_1=4$ cm for ratios $$\frac{\omega}{u_0}$$

of 0.2, 0.4 0.6, 0.8, and 1.0. We choose $r_0=1$ cm, $d_0=2$ cm, maximum spiral radius $r_1=4$ cm, c=0.2, w=0.3 cm, and γ=1.4.

Efficiency is $$\varepsilon = 1 - \frac{T_L}{T_H},$$

with $T_H=T_0$ the high post combustion temperature and $T_L$ the low exit temperature of gas.

At $\frac{\omega}{u_0} = 1.0$, efficiency is as high as 60%, at ω=377 rad/s (60 Hz), $u_0$=377 cm/s, a breezy speed (less than 15 kilometers per hour). Gas cools from 1000K to 400K (127° C.).

Pressure Change for Compression of a Gas in an Exponential Spiral

The exponential spiral expander when turning in a reversed direction compresses gas instead of expands gas. For adiabatic gas expansion, $p^{1-\gamma}T^\gamma$ is constant. Using this constancy, pressure p at radius r of the spiral can be derived from the temperature drop equation.

Pressure increase $p_0$ is given by:

$$p_0 = p\left\{1 + \frac{1}{\gamma-1}\frac{\omega}{(1-cr_0)u_0}\left[(2+cw)(r-r_0) - c(r^2 - r_0^2) - w\ln\frac{r}{r_0}\right]\right\}^{\gamma}$$

A centripetal gas pressure $p_o$ is a result of gas flow towards the center with velocity $u_0$.

If gas flows outwards with negative $u_0$, pressure p increases towards disk periphery instead. That outward gas compression is a centrifugal compressor used for the first jet engines invented during World War 2. Unfortunately, centrifugal compressors produces small pressure increases for its radial and centrifugal flow of gas. Later development of jet engines favors an axial instead of radial flow of gas through multiple stages of turbine blades that increase gas pressure from stage to stage.

We believe that centripetal compression is better than centrifugal compression for achieving a high compression ratio, which leads to better turbine efficiency. For centripetal instead of centrifugal gas compression, compressor turns in reversed direction pushing gas towards the center. The gas spiral must be tapering towards the periphery of turbine in order to trap gas inside spiral to move towards the center. Gas flow slows down towards the center, converting its kinetic energy into pressure energy. Tapering reduces flow velocity $u_0$ at the center, increasing the ratio $$\frac{\omega}{u_0}$$

which is important for increasing compression ratio $$\frac{p_0}{p}$$

in the above equation.

We describe here the multi-staging of radial compressors. A tapering exponential spiral expander (bottom left of FIG. 1 with anti-clockwise spiral turn) is placed on top of a tapering exponential spiral compressor (bottom right of FIG. 1 with clockwise spiral turn). We can use the inter-spiral space of both the expander and compressor for further compression of gas.

We devise gas flow direction as follows. Gas flows in between the tapering spirals in the spiral compressor from outside to inside. Halfway through, gas flows into the space in between the tapering spirals in the spiral expander. Gas flows from inside to outside in that space, with gas sped up by centrifugal force. At the periphery of the spiral expander, gas flow into the tapered end of the spiral compressor channels. Gas emerges at the center of the compressor triply compressed. The order of compression is first a tapering centripetal compression, followed by a centrifugal compression and finally by a centripetal compression.

Multiple staging of compression with cooling between stages reduces gas temperature. We considered isothermal gas compression requiring heat exchange between gas and environment. Isothermal gas compression requires less energy than adiabatic gas compression. Heat loss of pressurized gas facilitates cooling when gas expands.

For isothermal processes, work done $dW_T$ to compress gas generates heat dQ with $$Q = dW_T = nRT\ln\frac{p+dp}{p} = nRT\frac{dp}{p}.$$

This heat is transferred to environment. Energy conservation implies $$T\frac{\omega}{u}\left[2 - \frac{w}{r}\right] + \frac{T}{p}\frac{dp}{dr} = 0$$

For isothermal processes, pV=nRT is constant for constant T. Velocity u satisfies the condition that $Aup=A_0u_0p_0$ is a constant for given values $A_0$, $u_0$, $p_0$ The above differential equation becomes:

$$-\frac{dp}{p^2} = \frac{A}{A_0}\frac{\omega}{u_0}\frac{1}{p_0}\left[2 - \frac{w}{r}\right]dr$$

Solving the above differential equation with a tapering factor c, we have the pressure ratio:

$$p_0 = p\left\{1 + \frac{\omega}{(1-cr_0)u_0}\left[(2+cw)(r-r_0) - c(r^2 - r_0^2) - w\ln\frac{r}{r_0}\right]\right\}$$

This pressure increase is much less than that for a spiral that tapers inwards. FIG. 3 plots pressure ratio for isothermal compression, for r in the range $r_0=2$ cm$\leq r \leq r_1=16$ cm for ratios $$\frac{\omega}{u_0} = 0.05, 0.10$$

0.15, 0.20, 0.25. Tapering factor is $c=0.025$ and width $w=1$ cm. The unknown exit velocity $u_0$ is determined by pressure at the two ends of the spiral, namely $p_0$ and $p_1$. Velocity $u_0$ will adjust to become the solution of the above equation for given $$\frac{p_0}{p_1}.$$

Pressure increases linearly as the angular velocity $\omega$ and compressor radius. Compression increases as flow velocity $u_0$ slows. More work is done to compress a slowly flowing gas. Flow velocity $u_0$ is related to rim flow velocity $u_1$ by the conservation of flow equation $A_0 u_0 p_0 = Aup$ for isothermal compression. Substituting $$\frac{p_0}{p} = \frac{Au}{A_0 u_0}$$

into the pressure ratio equation:

$$u_0 = \frac{1-cr}{1-cr_0}u - \frac{\omega}{1-cr_0}\left[(2+cw)(r-r_0) - c(r^2 - r_0^2) - w\ln\frac{r}{r_0}\right]$$

For $c=0$, isothermal compression reduces velocity as $$u_0 = u - \omega\left[2(r-r_0) - w\ln\frac{r}{r_0}\right].$$

A New Electric Generator and Motor

We invent electric generator and motor that have the same disk form factor of our spiral turbine. Pioneers such as Edison, Tesla, and Steinmetz were frustrated by technology available then. The first problem was the lack of strong permanent magnets. Lacking strong permanent magnets, large electromagnets were used to induce electricity. The second problem was the lack of high speed heat engines such as the modern gas turbine. Magnets have to be strong to convert the slow but large torque of steam engines. The third problem was the lack of solid state electronics for digital and solid state control of voltages and currents.

Modern technology solved these problems. Rare earth magnets give strong magnetic field. High speed turbines run much faster than piston steam engines. Solid state high power electronics provides flexible control of voltage and current. Digital electronics can synthesize variable frequency, phase, and amplitude of AC. Our generator is simpler and more compact than Faraday's or Tesla's.

FIG. 4a illustrates how electricity is induced in 3 triangular solenoids by the relative motion of the circle of 6 magnets of alternating polarity. A circle of magnets induces electricity in polygonal solenoid. Magnetic flux through the solenoid changes as a sinusoid. Inducing an electric potential between the two ends of the solenoid according to Faraday's Induction law to convert motion into alternating current.

The polygon for the solenoid can be a triangle, square, rectangle, or pointed star, etc. The polygon includes changing magnetic flux as it rotates coaxially with a magnetic circle of alternating poles.

The stator coil comprises multiple triangular turns of magnet wires or tapes. As the magnet circle turns, triangular coil overlaps with no magnets, magnets of north polarity, or magnets of south polarity.

The magnets in FIG. 4a are of radius r. The center of the magnets is at distance 6 r from the center of the circle. The three triangles are wounded on an outside circle of radius 8 r. As seen in the figure, the upright triangle is bounded by all 6 magnets. There is no net magnetic flux inside the triangle. When the rotor has turned clockwise by 30°, the triangle contains entirely the magnetic flux of magnets of the same polarity (north in the figure). When the rotor turns another 30°, net magnetic flux is zero again. When the rotor turns yet another 30°, the triangle contains entirely the magnet flux of magnets of opposite polarity (south in the figure). Upon completion of turning a total of 4×30°=120°, the triangle contains again zero net flux. Magnetic flux varies as a sinusoid three cycles per 360° turn.

By Faraday's law of induction, electromotive force (EMF) induced in the triangular solenoid of N turns is $$v(t) = -N\frac{d\Phi}{dt},$$

the rate of change of magnet flux $\Phi$ over time t. Flux $\Phi$ in each triangle has peak value $\Phi_{max}=3BA$ for 3 magnets of magnetic field strength B over their top of area. Induced EMF for rotational frequency f is $v(t)=3NBA\times2\pi\times3f\times\cos(2\pi\times3 ft)=18\pi fNBA\cos 6\pi ft$.

If we use three triangles rotated by 40° relative to each other, we generate three-phase AC with a common neutral. The three triangles form a nine-point star as shown in the figure.

This AC generator can be used as an electric motor. By Ampere force law $dF=i\times dl\times B$, a force vector dF is the vector product of current vector i with length vector dl and magnetic field B. EMF power dissipated is $P(t)=v(t)i(t)$. EMF is converted into mechanical force.

Rotational speed of rotor depends on the balance of force between EMF and mechanical load. Without mechanical load, terminal velocity of rotor is determined by voltage amplitude v(t). Voltage v(t) and current i(t) are 90° of out phase with no net electrical power dissipated over time.

As we increase mechanical load, rotor velocity decreases. Induced EMF drops. However, phase difference between current and voltage changes, resulting in dissipation of EMF to generate motion.

Thus the speed of motor is determined by voltage and torque force is determined by current. For AC motor, an electric speed controller (ESC) is required to control voltage and current. An ESC controls frequency and therefore rotational speed by digital pulse width modulation method.

Since motion between triangle and circle is relative, the triangle role as stator and the circle role as rotor can be exchanged. We can fix the magnetic circle as stator and rotate the triangle as rotor.

Figure 4B:
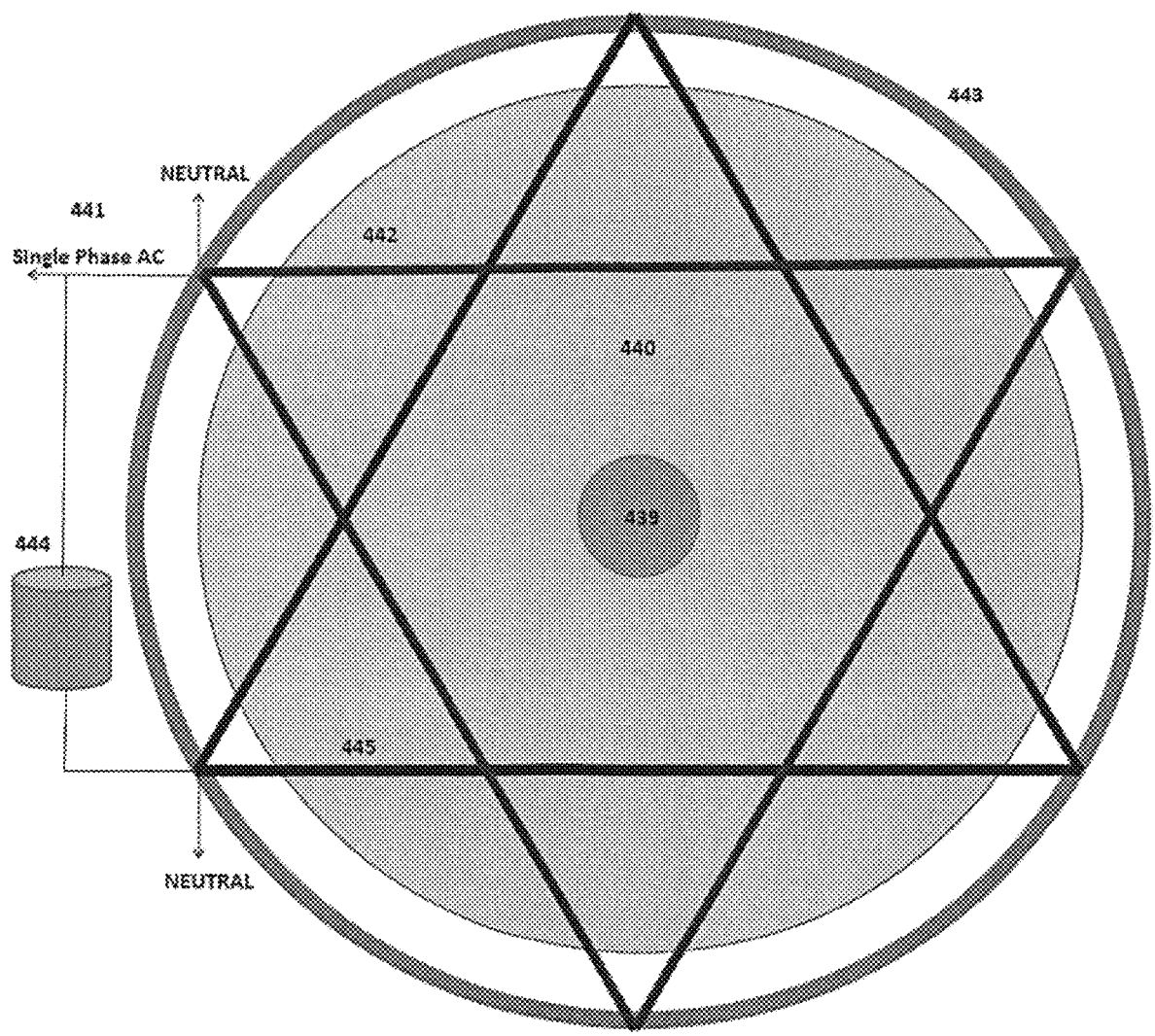

The motor of FIG. 4a can be modified as an induction motor as shown in FIG. 4b. Instead of the rotor of magnets with alternating polarity, a circular conductor disk is used to generate the magnetic field of alternating polarity. As a motor, the polyphase AC generates a rotating pattern of alternating polarity magnetic field. By Lenz's law, this rotating magnetic field Induces reactionary electric current in such a way to oppose the magnetic field generated by the inducing current in the polygon windings. Motion is generated during to Lenz's law in opposition to the inducing current.

To operate this polyphase AC induction motor as an AC induction generator, the generator needs to be primed for motion first. The initial motion induces a magnetic field in the circular conductor disk.

Figure 4C:
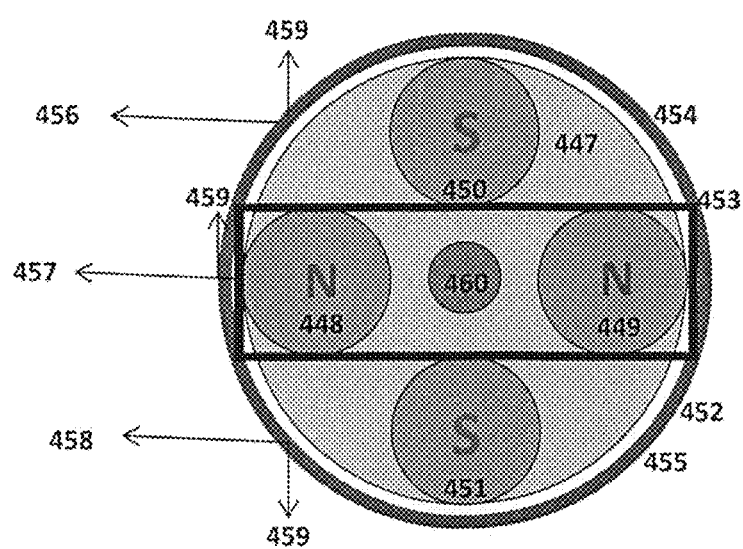

FIG. 4c shows another embodiment of a polygon AC generator. The rotor comprises 4 magnets of alternating parity. Each magnet has radius r. Opposite magnets of the same polarity are separated by a center-to-center distance of 4r. Each solenoid is rectangular with dimension 2r×6r.

As the rotor rotates, each rectangle may include magnetic flux of both north poles, no net flux, or flux of both south poles. Each complete rotation generates two AC cycles, instead of three AC cycles for the generator of FIG. 4a. Used as an AC motor, motor speed is higher. When driven by 60 Hertz AC, the motor of FIG. 4a rotates at 1200 rpm, while the motor of FIG. 4c rotates at a higher 1800 rpm.

Figure 4D:
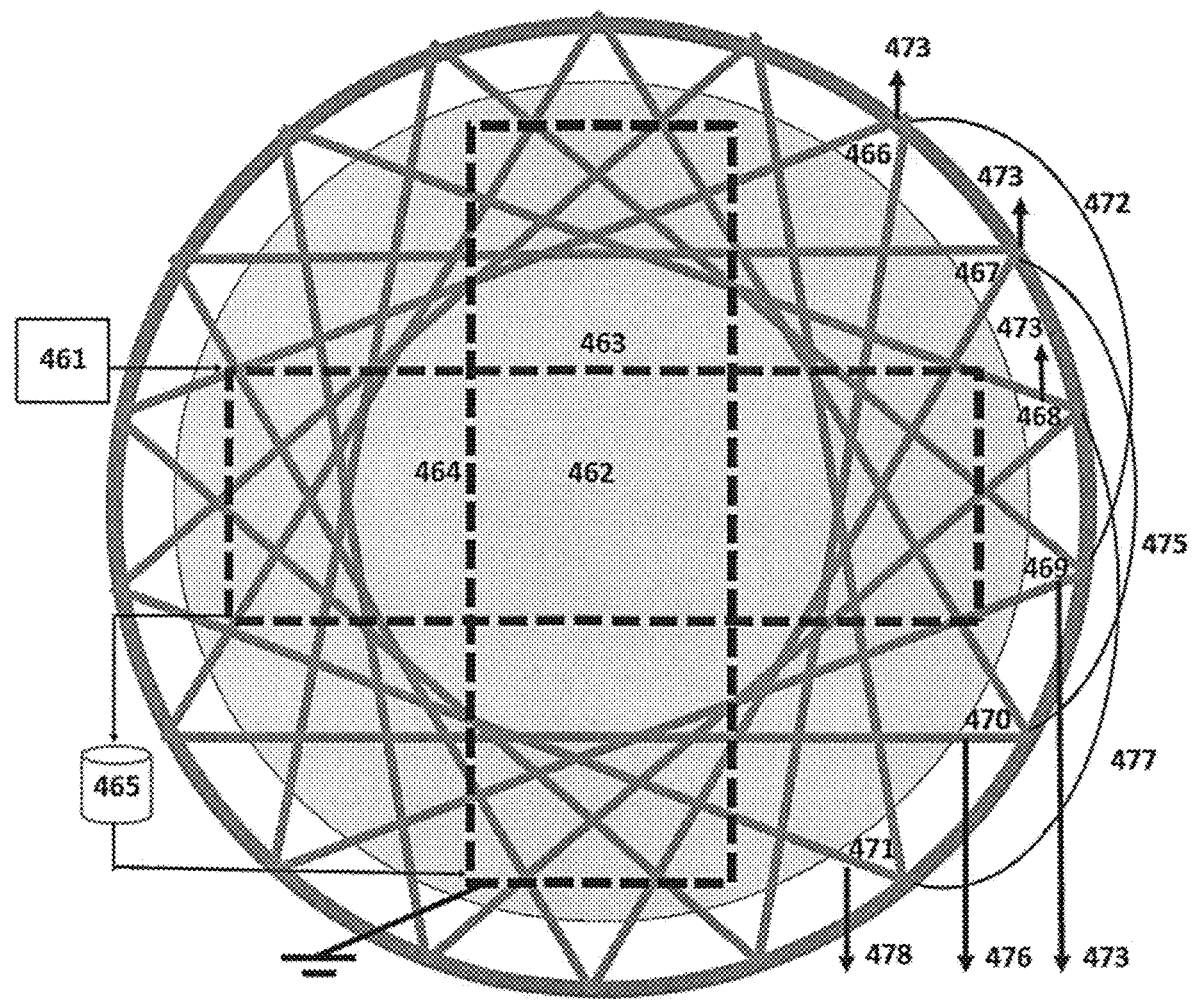

A transducer of AC frequency and voltage is shown in FIG. 4d. The transducer comprises a tandem of motor-generator of different number and kind of polygons for the motor versus the generator. As shown, the motor uses two rectangular windings such as that in FIG. 4c, while the generator uses six triangular windings such as that in FIG. 4a. AC frequency from generator is 3 times higher than the AC frequency driving the motor. AC voltage depends on the ratio of turns for generator versus motor.

No rotor is needed for the motor or generator in FIG. 4d. The 2 rectangular winding produces the magnetic field to induce voltage in the 6 triangular winding. This frequency and voltage transducer is similar to voltage transformer with no moving part. Frequency transduction is facilitated by geometry.

First Application of Tapering Spiral Turbine: A Gas Turbine with Electric Generator Our heat turbine uses the Brayton thermodynamic cycle to convert heat to work. Pressure versus volume graph of the Brayton cycle is shown in the bottom of FIG. 2. Brayton cycle comprises four phases: adiabatic and isentropic compression of air 1→2, isobaric heat addition and expansion of gas 2→3, adiabatic and isentropic expansion of gas 3→4, and isobaric cooling of the gas post turbine 4→1.

Brayton cycle heat engine efficiency is analyzed as follows. Consider temperature T and pressure p of the gas throughout the Brayton cycle. Adiabatic compression of gas (1→2) maintains constant $pV^\gamma$ and $TV^{\gamma-1}$. Adiabatic coefficient is $\gamma=1.4$ for diatomic gases. Let us assume air and fuel to be at 1 bar pressure and 300 K (27° C.) temperature. Adiabatic compression of volume by a factor of 8 increases pressure to 18.38 bars and temperature to 689.2K (343.3° C.).

When fuel-air mixture is combusted under constant pressure (2→3), heat of combustion increases the volume of the combusted mixture, giving out work as volume expands. After isobaric expansion, combusted air expands further as pressure drops towards spiral exit (3→4). Work is further given out by the gas expanding adiabatically inside the spiral. Exhaust gas cools externally (4→1).

Work W is given by the area in the pressure versus volume plot for the Brayton cycle. For adiabatic expansion, $pV^\gamma$ is constant. Pressure $P_L$ and $P_H$ are low and high pressure before and after the compressor. Volume $V_L$ and $V_H$ are low and high pressure volumes before and after the compressor. Work done by Brayton cycle is $$W = \int_{p_L}^{p_H} V dp = C \int_{p_L}^{p_H} p^{-\frac{1}{\gamma}} dp = C'\left(p_H^{\frac{\gamma-1}{\gamma}} - p_L^{\frac{\gamma-1}{\gamma}}\right)$$

The constants C, C' depend on initial conditions of gas volumes. Renormalizing by the heat of combustion Q for each cycle, the efficiency of this Brayton cycle heat engine is $$\varepsilon = \frac{W}{Q} = 1 - \left(\frac{p_L}{p_H}\right)^{\frac{\gamma-1}{\gamma}} = 1 - \left(\frac{V_H}{V_L}\right)^{\gamma-1} = 1 - \frac{T_L}{T_H}$$

Brayton cycle has constant pressure (isobaric) at two steps of the cycle with pressure $P_L$ and $P_H$. Efficiency depends on the pressure ratio $$\frac{p_L}{p_H}$$

or the compression ratio $$\frac{V_H}{V_L}.$$

Carnot neat engine efficiency is given by $$\varepsilon = 1 - \frac{T_L}{T_H},$$

which depends on the low versus high temperature ratio $$\frac{T_L}{T_H}.$$

If we assume a volume compression of 8 by the compressor, pressure is increased by 18.38 times according to a constant $pV^\gamma$. Brayton cycle efficiency is $$\varepsilon = 1 - \left(\frac{p_L}{p_H}\right)^{\frac{\gamma-1}{\gamma}} = 1 - \left(\frac{p_L}{p_H}\right)^{\frac{2}{7}} = 1 - \left(\frac{1}{18.38}\right)^{\frac{2}{7}} = 1 - 0.435 = 0.565$$

An implementation of our heat engine is shown in FIG. 5. The bottom of the heat engine is a compressor cylinder. An alternative compressor that may be used is the Archimedes scroll compressor shown in FIG. 9. The top is an expander cone which has a constant width spiral with tapering depth. Compressed air passes from the top center of the compressor to the bottom center of the expander. Fuel flows through a small tube from bottom center of the compressor to ignite in the center combustion chamber of the expander. Pressure force of expanding air post combustion turns the single compressor-expander assembly, providing motive force. Electricity is generated through the homopolar generator at the bottom of the assembly.

Second Application of Tapering Spiral Turbine: Motor Driven Heat Pump/Dehumidifier Heat pumps and refrigerators often use refrigerants such as hydrofluorocarbon (HFC). Compressing HFC gas pumps heat into the pressurized HFC which liquefies when cooled. Evaporation of liquid HFC under reduced pressure removes heat from the environment. This liquefaction-evaporation cycle constitutes the Rankine cycle heat pump process. However, refrigerants such as HFC if released into the atmosphere are potent global warming gas. HFC traps more than 1000 times the heat than carbon dioxide. HFC is scheduled for rapid replacement according to a recent Kigali Agreement.

Airplanes use an alternative air conditioning method that uses instead the Drayton cycle heat pump process. Air is bled from the compressor of the jet engine. A mild reduction of air pressure rapidly cools the bled air. Chilled air from cabin air vent is often misty. The mist chills air further with as the mist evaporates. Moist air when compressed produces fogging and misting. If we cools compressed moist air, we can remove humidity in air as well as produce water for consumption. Condensing moisture in air also drives out the heat of evaporation of water from air. Thus more heat removal is achieved.

This observation inspired the use of the Hui spiral compressor to produce chill and water condensate. We explain here the thermodynamic advantages. We introduce here a new thermodynamic heat pump process which we name as the Hui cycle as shown at the bottom of FIG. 3. The Hui cycle merges two thermodynamic cycles: the Carnot cycle with isothermal and adiabatic phases and the Brayton cycle with isobaric and adiabatic phases. We replace the adiabatic processes of the Brayton cycle by isothermal processes. Isothermal compression reduces the amount of work needed. Isothermal expansion increases work produced using ambient heat from the environment.

The Hui cycle requires compressors and expanders with built-in heat exchangers. Heat exchange can be achieved by ambient air flowing between spiral channels. The phases of the Hui cycle is shown in FIG. 3. There are three temperatures: ambient temperature $T_a$, high temperature $T_H$ at which heat is extracted, and low temperature $T_L$ at which chill is produced.

Phase 1→2 is the isothermal compression phase of gas at $T_H$, requiring compression work $W_c = nRT_H \ln p_H/p_L$ in which $p_H$, $p_L$ are the high and low pressures of the isobaric phases. This work is changed entirely into heat of compression $Q_c$ dissipated without increasing the temperature of the gas.

Phase 2→2a is the isobaric cooling of the gas from high $T_H$ to ambient $T_a$. Phase 2a→3 is the further isobaric cooling of the gas from ambient $T_a$ to low $T_L$.

Phase 3→4 is the isothermal expansion phase of the gas at the low $T_L$, producing work of expansion $W_e$ by the heat absorbed $Q_e$, with $Q_e = W_e = nRT_L \ln p_H/p_L$.

Phase 4→4b is the isobaric heating of the gas from low $T_L$ to ambient $T_a$. Phase 4b→1 is the further isobaric heating of gas from ambient $T_a$ to high $T_H$.

We use counter flow heat exchangers to reuse heat. For Phase 2→2a, heat given out is exactly absorbed by Phase 4b→1. For Phase 2a→3, heat given out is exactly absorbed by Phase 4→4b.

We attribute performance of heating and chilling as follows. The coefficient of performance of heating $COP_h$ is the heat produced $Q_h$ divided by the net work done $W_{net} = W_c - W_e$. Thus $$COP_h = \frac{nRT_H \ln p_H/p_L}{nRT_H \ln p_H/p_L - nRT_L \ln p_H/p_L} = \frac{T_H}{T_H - T_L}$$

The coefficient of performance of cooling $COP_c$ is the chill produced by isothermal expansion $Q_e$ divided by the net work done $W_{net} = W_c - W_e$. Thus $$COP_c = \frac{nRT_L \ln p_H/p_L}{nRT_H \ln p_H/p_L - nRT_L \ln p_H/p_L} = \frac{T_L}{T_H - T_L}$$

Consider the heating of water from $T_a = 27°$ C. (300K) to $T_H = 77°$ C. (350K) and for cooling of air from $T_a = 27°$ C. (300K) to 7° C. (280K). We have $$COP_h = \frac{350}{350-280} = 5 \text{ and } COP_c = \frac{280}{350-280} = 4.$$

Traditional chilling compresses refrigerant such as CFC which depletes ozone, or HFC which traps heat. We should compress air directly instead of compressing a refrigerant. The Hui cycle can achieve ideal heat pump efficiency. Work is recovered from the expanding gas, in contrast, evaporating refrigerant produces no work. Without efficient air compression with high compression ratio, liquefaction of refrigerant is preferred. Substantial research is aimed at finding effective refrigerants that do not harm the environment. With compact spiral turbines, we can compress air effectively. We can therefore avoid the use of refrigerants.

Better yet, compressing humid air condenses moisture in air upon removal of heat of compression. The heat of condensation is dispersed. Traditional air conditioning requires the use of chill produced by the evaporation of refrigerant gas to remove humidity and its heat of condensation. Dehumidifying air increases the work load of the air conditioner for the same drop of air temperature.

The condenser of traditional air conditioner is located outside the building, condensing humidity that often drips down on people. For our proposed air conditioner, we contain the condensing moisture inside an enclosed condenser. The collected moisture can be emptied by a tube or collected for human and plant consumption.

Evaporating water exerts a vapor pressure that depends only on temperature. That vapor pressure is part of the pressure exerted by humid air. Each component gas of air exerts its own vapor pressure. Air components include oxygen (19% by volume), nitrogen (80%), argon (1%), and water (percentage depending on humidity level). Atmospheric pressure is the sum of the vapor pressure of various air components. Total vapor pressure is around 1 bar at sea level.

Humidity of air is defined as water content in air divided by water content in 100% humid air. Dew point is defined as the temperature when that air is cooled to the point that water starts to condense in 100% humid air. Dew point and air temperature are the same with 100% humidity. Take for example 100% humid air at 25° C. and 14° C., which contains respectively 2 grams of water and 1 gram of water for 100 gram of air. Thus the dew point of 50% humid air at 25° C. is 14° C.

What happens to air moisture if we double the pressure of 100% humid air at 25° C.? Initially, vapor pressure of all air components doubles. Humid air, which is heated up by compression, is cooled back down to 25° C. Since water vapor pressure depends only on temperature, increased water vapor pressure due to compression causes water to condense. Half of the water vapor of air would have to condense out to restore to the same vapor pressure of water at 25° C.

For high humidity air, most moisture in air condenses out if we compresses air volume by a factor of 2 to 4. That condensation releases a significant amount of heat of condensation. Consider increasing pressure by a factor of 2 for 80% humid air at 25° C. That air has 1.6 grams of water per 100 grams of humid air. Increasing pressure and subsequent cooling of humid air would force 0.6 grams of water out. At more than 2200 joules of heat of evaporation per gram of water evaporated, pressure would drive out 1321.2 joules of energy for 0.6 grams moisture condensed.

This heat is significant compared the cooling of air. Consider the latent heat of cooling 100 grams of air by 20° C. The heat that requires chilling removal is $$\Delta H = anR\Delta T = 2.5 \times \frac{100 \text{ g}}{28 \text{ g}} \times 8.3 \times 20 = 1482 \text{ J}.$$

Quadrupling pressure of 80% humid air at 25° C. would force out 1.2 grams of water vapor with heat of condensation of 1.2 g×2200 J/g=2640 J, which is more than the heat removed for cooling air by 20° C. Water removed from air produces water for human or plant consumption.

FIG. 6 shows the heat pump for generation of hot water, chilled air, and condensed water. A top compressor driven by our motor compresses air from the bottom center of the compressor into a heat exchanging tube. The tube goes through the center of a water tank, giving its heat of air compression and water condensation to heat up water in the tank. Condensed water and cooled compressed air are collected at the bottom tank. Compressed air drives the expander at the top, giving chilled air for space cooling. Compressed air can also be distributed over nylon tubes to expander in room for chilling as well as generating work and electricity for lighting and consumption by appliances.

Third Application of Tapering Spiral Turbine: Solar Water Desalination

We can use the spiral compressor for solar desalination of water. Electricity for driving the compressor can be produced by solar thermal or photovoltaic power. Solar energy can be concentrated and collected as heat to boil sea water at reduced air pressure. Our spiral compressor can be used to condense steam from solar evaporated salty water. The heat of condensation can be used to evaporate more salty water. Thus a high efficiency of water desalination can be achieved.

Solar desalination was inspired while I heard a loud hissing sound and saw steam coming out of a solar water heater in Tibet of China. The low air pressure of Tibet makes water boils at a lower temperature than 100° C. Water boils at 80° C. when atmospheric pressure is halved.

We can recreate this low pressure environment at the head of a tail water column. Water boils at 80° C. on top of a 5 meter water column where pressure is halved. A 10 meter water column has zero pressure at the top where water would evaporate profusely. Resulting vapor pressure causes the water column to drop. We would need a pump to remove vapor in order to create a near vacuum at the top.

FIG. 7 shows a novel solar water desalination device. For conventional solar water heater, solar heat is trapped to heat water in a glass tube. That glass tube is contained in another vacuumed glass tube. The outer glass tube has a reflective half surface that reflects sunlight onto the inner water heating tube. Similar to solar water heater, we use a much larger reflector of light. The reflector is shaped like a conic surface as shown in FIG. 8 to concentrate sunlight onto a vertically placed tube of water. The reflector tracks the sun in the azimuth position $\alpha$. A sun due North has $\alpha=0°$. The reflector also tracks the sun in the altitude or elevation, defined as the angle $\beta$ sunlight makes with the horizon. A directly overhead sun at zenith has $\beta=90°$. A sun on the horizon has $\beta=0°$.

FIG. 8 shows a conic reflector, which is part of the curvilinear surface of a cone. We call the center line of the conic surface the apex line. The apex line should follow the azimuth location of the sun. To track the sun in its altitude, the apex line tilts with angle $\delta$ from zenith such that reflected light shines horizontally on the vertical salty water column.

A horizontal cross section of the conic surface is a parabola with focus on the vertical z-axis. Consider a directly overhead sun at the zenith with $\beta=90°$. If the apex line is tilted with $\delta=45°$, overhead sunlight is reflected horizontally onto the column of salty water. The reflector is conic in the sense that the cone is formed by rays from the origin (0,0,0).

Consider an elevation of $\delta=45°$ for the conic surface as shown in FIG. 8. Let the tip of the cone be located at the origin (x,y,z)=(0,0,0). The column of salty water is centered on the z-axis. The parabolic cross section at level z has apex minimum located at (x,y,z)=(0,z,z). Light is focused onto (x,y,z)=(0,0,z) with focal length p=z if the sun is directly overhead with $\beta=90°$ as shown in FIG. 8. For a given vertical level z, the parabola at level z is $x^2=4p(z)(y-p(z))$, in which (p(z) is the focal length of the parabola at level z.

Consider the more general case of $\beta>0$. We want to reflect sunlight so that it hits the vertical column horizontally. The resulting tilt of the apex line is $$\delta = \frac{\beta}{2}.$$

For the sun at zenith $\beta=90°$, tilt is $\delta=45°$. The apex line is the equation y=z tan $\delta$ on the y-plane. The conic surface is given by the equation $x^2=4z$ tan $\delta$ (y−z tan $\delta$) as shown in FIG. 8. The conic surface is curvilinear in the sense that a flat sheet of reflective material can be put on the surface of a cone. The focal length at level z is z tan $\delta$.

While it is important for the reflector to track the sun well in the azimuth position, it is less important to be able to track the sun exactly in the altitude. The resulting focal line remains on the z-axis, although the line may be shifted up or down on that axis according to the altitude of the sun. Thus it may be sufficient to have prearranged tilting of δ for the reflector, such as δ=15°, 30°, and 45° for altitude of the sun β=30°, 60°, and 90° respectively.

Reduced pressure at the head of water makes water boil at lower temperature. Water boils when vapor pressure of water is equal to the ambient pressure. Vapor pressure depends only on temperature. As shown in FIG. 7, the key step for water desalination is to compress low pressure water vapor to condense at higher pressure. A spiral compressor is placed above the head of water to remove vapor.

The compressed and heated water vapor emerges from the center of the spiral compressor into a long thin tube down the center of the water column. Water condenses as water vapor yields its heat in exchange with the surrounding boiling water. Condensed water is collected in the closed vessel at the bottom of the column as shown in FIG. 7. Fresh water can be pumped out of the condensation chamber.

As water vapor condenses, it yields significant amount of heat of condensation. Capturing this heat of condensation significantly enhances the efficiency of water distillation.

As water head, evaporation concentrates saltiness. This heavy and hot brine solution is discharged after yielding its heat to incoming salty water through a counter flow heat exchanger.

Efficiency of desalination has thermodynamic limits. More heat is required to evaporate salty water than heat released by condensing steam. Also, compression of steam by the spiral turbine requires work that is changed into heat of compression. However, extra energy required can be abundantly supplied by solar thermal and photovoltaic power. Heat is lost by convection on the outside of the salty water column. With good insulation and heat exchange, we expect high efficiency.

Electricity for operating the compressor can be supplied solar photovoltaic cells. Electricity is used to compress low pressure water vapor. Motion energy is converted into heat of compression. Both heat of compression and condensation are used for more evaporation of salty water.

The predominant way of thermal desalination employs multistage flash distillation. Seawater is heated by fossil fueled power plants. Hot seawater is flashed into successive stages of evaporation chambers with progressively reduced pressure. We use a spiral compressor instead of staging.

Drinking salty water has become a health problem in the Indian subcontinent. Pacific islanders can also draw on solar desalination for drinking and cleaning purposes. We hope the new method of solar desalination can be of vital help to coastal people without using polluting and expensive fossil fuel.

Detailed Description of Tapering Exponential Spiral Expander and Compressor

FIG. 1 shows the tapering exponential spiral (top) and its embodiments as an expander (bottom left) and compressor (bottom right).

The spiral has outer wall 001 that comprises a radius that has made turn angle θ 002. The radius is of length indicated by 003.

The spiral has inner wall 004 of lesser length than the outer wall. The radial distance between the inner and outer wall decreases exponentially as the turn angle with width indicated by 005.

The beginning of the spiral channel 006 is wider than the end of the spiral channel 007. Gas flow depends on spiral spin direction. If the spiral is turning in a clockwise direction, gas flows from inside to outside by centrifugal force. The outflowing gas expands, if the spiral is turning in an anticlockwise direction, gas flows from outside to inside by centripetal force, thereby compressing the inflowing gas.

An embodiment of a tapering exponential spiral expander 101 is shown in the bottom left disk of FIG. 1, comprising a plurality of 4 spiral channels 102, 103, 104, 105, each of which spirals outward in an anticlockwise direction. This plurality allows more gas flow in a disk, thus enhancing the power of the turbine. The spiral turbine disk 101 turns in a clockwise direction as indicated by 110 in reaction to gas flowing anticlockwise in these spiral channels.

For spiral channel 102, gas flows from the spiral inlet 108 for 1.5 turns before reaching the spiral outlet 107. Anticlockwise flowing gas presses against the outer spiral wall of spiral channel 102. For spiral channel 105, gas flow direction is indicated by the arrow from the inlet 108 and the arrow at the outlet 109. These two arrows indicate an anticlockwise flow of 1.5 turns.

For spiral channel 102, the outer wall of the spiral compresses two parts. The first part 106 has a faster exponentially growing radius for $$-\frac{\pi}{2} \leq \theta \leq 0.$$

There is no inside wall for that range of θ: gas comes into the spiral 102 through the gas entry center hole 108. The inner wall of the spiral 102 is the outer wall of spiral 103 for the range $$0 \leq \theta \leq \frac{\pi}{2}.$$

The inner wall 107 of the spiral 102 for the range $$\frac{\pi}{2} \leq \theta \leq \frac{5\pi}{2}$$

is the outer wall of spiral 102 less a constant spiral width w for that range of θ.

While the radius r is exponentially expanding in θ, the spiral bore can be tapered by depth d of the spiral that is decreasing exponentially in θ, which is equivalent to a linearly decreasing d versus radius r. Thus when viewed sideway, the disk shaped expander resembles a cone 513 as shown in FIG. 5.

The same expander 101 when spun in the opposite anticlockwise direction can become a gas compressor which compresses gas from outside inwards towards the center of the spiral disk.

The bottom right of FIG. 1 shows a compressor 111 with 4 exponential spirals 112, 113, 114, 115 going from inside to outside in a clockwise direction. This plurality allows more gas flow in a disk. The spiral turbine disk 111 turns in a anticlockwise direction as indicated by 120. The motive force for this anticlockwise spinning can be provided by a spiral expander 101 spinning in the same clockwise direction. The spiral expander could be stacked on top of the spiral compressor as a single gas turbine as shown in FIG. 5, with the coaxial expander-compressor spinning in the same clockwise direction.

The spiral compressor 111 can be driven by a motor instead. For compressive condensation of low pressure steam from evaporated salty water in FIG. 7, a motor drives the compressor.

For spiral channel 112, gas flows from the outside spiral inlet 112 for 1.5 turns before reaching the spiral outlet 118 at the center of the spiral disk 111. Anticlockwise flowing gas is pressed by the outer spiral wall of spiral channel 112, increasing gas pressure as it flows toward the center of the spiral disk. For spiral channel 115, gas flow direction is indicated by the arrow from the inlet 119 and the arrow at the outlet 118. These two arrows indicate an anticlockwise flow of 1.5 turns.

The depth of the spiral channels can be tapered from center to outside. Gas flows from outside to inside slows down due to the expansion of spiral depth from outside to the center.

Gas can be allowed to flow in between spirals, driven by the rotary motion of the turbine disk. Gas flowing in between spirals can exchange heat with gas flow inside spirals. For gas compression, compressed gas inside spiral may be cooled by gas flowing in between spirals, achieving more isothermal than adiabatic compression. For gas expansion, expanding gas inside spiral may be heated up by gas flowing in between spiral, giving more motive force for gas expansion.

These spiral compressors and expanders may operate in stages. A compressor 111 may be stacked coaxially with an expander 101, with gas flowing through a shared center for gas to flow from the center 118 of compressor 111 to center 108 of expander 101. Compressors can also be coaxially stacked for higher compression ratio, with gas channels flowing from center 118 to inlet 112 by radial conduit. Expanders can also be coaxially stacked with similar radial channels from outlets to inlets. Gas compression can also be enhanced utilizing the channels in between spirals, using these channels as centrifugal or centripetal gas compression.

Detailed Description of Electric Generator

FIG. 4a shows an implementation of a three-phase AC electric generator 401 with three triangular stator induction coils 402, 403, 404 for output phases 405, 406, 407 and a circular magnetic rotor 408 of permanent magnets 409, 410, 411, 412, 413, 414 alternating polarities with marked north (N) and south (S) poles. As motion is relative, the inductor coil may rotate in a static magnetic circle instead.

The magnets are equally spaced on a circle of radius centered at 415, which is also the axis of rotation. These magnets are axially magnetized. Each magnet is placed inside a socket in the rotor. The bottom of these magnets are placed on plate 416 of high magnetic susceptibility for magnetic flux to flow among alternating poles on the plate. This provides easy permeation of magnetic field.

The other ends of these magnets are air gaps such as one labeled as 417. Above the air gaps is another plate 418 of high magnetic susceptibility. This plate allows easy permeation of magnetic field among the poles. The plates 416, 418 may be connected by a hollow cylinder 419.

The triangular stator coil 402 has three sides 420, 421, 422 and three included angles 423, 424, 425. The side 420 lies just above the magnet pair 412, 413. Similarly, the side 421 lies just inside the magnet pair 410, 411, and the side 422 lies just inside the magnet pair 409, 414. The triangular stator coils 403, 404 are similarly bounded by the magnet pairs.

These three coils formed a nine-point star with all corners of the solenoids affixed on the stator case 426. The 3 triangular coils are shifted relative to each other by 120°, ⅓ of the 360° turn. The coil 402 has net zero magnetic flux. The coil 403 includes about ⅔ of southward magnetic flux. The coil 404 includes about ⅔ of northward magnetic flux.

As the circle of magnet turns, magnetic flux changes inside each coil. Consider turning coil 402 in steps of anticlockwise turns each of 30°. The corner 425 moves to 427, containing all magnetic flux from the north pole of magnet 409. The corner 423 moves to 428, containing all magnetic flux from the north pole of magnet 413. The corner 424 moves to 429, containing all magnetic flux from the north pole of magnet 411. Coil 402 has maximum northward magnetic flux.

If the triangular coil 402 is turned anticlockwise by another 30° relative to the circle of magnets, the corners 430, 431, 432 contains no magnetic pole, making net magnetic flux zero again.

If the coil 402 is turned anticlockwise by another 30°, the corners 433, 434, 435 contains the south magnetic poles 414, 412, 410 respectively. Coil 402 has maximum southward magnetic flux.

If the coil 402 makes yet another anticlockwise turn by 30% the corners are located now at 423, 424, 425 back to the initial positions of the coil with zero net magnetic flux inside the triangle.

The coil made four 30° turns for a total of 120°. EMF output 405 completed phase change of 360°. If the rotor turns at a frequency of f Hertz, each phase has a frequency of 3f Hertz.

The two other coils work similarly. Since the three coils are offset from each other by 120°, the power outputs are also offset from each other 120°. Three output loads 436, 437, 438 consume the electrical power produced. As load increases, rotation speed slows, voltage drops, and current increases.

The same apparatus for electricity generation can operate as an electric motor to convert electricity to motion. Output load 436, 437, 438 are now the output of an electronic speed controller ESC. Controlled frequency, voltage, and current create a torque on the rotor to drive a mechanical load.

This polygon electric motor can be modified as a polygon induction motor as shown in FIG. 4b. The polygon induction motor has a rotor centered around the axle 439. The rotor uses a circular conductor disk 440 for the rotor instead of the rotor of magnets of alternating polarity. Lenz's law states that magnetic action and reaction are equal and opposite. The polygon windings induce currents in the circular conductor disk 440. Motion results from the opposing magnetic fields in the stator and rotor.

FIG. 4b, a single-phase AC power source 441 induces a changing magnetic field in the triangular coil 442 mounted on stator 443. The coil 442 induces currents in the circular disk 440, producing rotating magnetic fields of alternating polarity. To prime the rotation in a desired direction, a capacitor 444 is used to make current to lead the voltage. The leading current 445 then drives another triangular winding 446. This induction motor is also a generator, requiring a priming current to start the generator.

Another AC generator is shown in FIG. 4c. The rotor 447 comprises 4 magnets 448, 449, 450, 451. The stator 452 comprises 3 rectangular solenoid coils 453, 454, 455 to generate three phases of electricity 456, 457, 458 with a common neutral 459. Motion by axle 460 is converted into electricity.

A motor-generator pair of FIG. 4*d* can be used to transduced AC frequency and voltage of a power source 461. The pair shares an inductive rotor plate 462. Beneath the plate is the motor stator with 2 rectangular windings 463, 464, connected by capacitor 465 to give current in 464 a 90° phase lead. The stator windings drive the rotor 462. The induced current in the rotor in turn induces current in 6 triangular windings 468, 467, 468, 469, 470, 471 above 462. Winding pair 466, 469 is connected in series by 472, with one neutral end 473 and the other end yields an AC phase 474. Pair 467, 470 connected by 475 yields another AC phase 476. Pair 468, 471 connected by 477 yields the third AC phase 478.

The rotor plate 462 can be superfluous, as the single phase AC in the rectangular winding can induce directly three phase AC in the triangular winding. The resulting transducer without rotor is static.

Detailed Description of Integrated Heat Turbine and Generator

FIG. 5 shows the cross section views of heat turbine and generator. The heat turbine comprises a compressor 501, the heat chamber 502, and the expander 503, with the horizontal cross section view shown as two 4-spiral disks on the top and bottom of FIG. 5.

Four compressor spiral channels 504, 505, 506, 507 turn to compress air from outside in. Compressed air then passes from the center of the compressor 501 into the heat chamber 502. As the compressor turns in one direction (shown clockwise in the figure), gas is compressed by flowing in the opposite direction in the compressor spiral channels (anti-clockwise in the figure).

For heat generation by gas combustion, combustible gas enters the heat chamber 502 through fuel nozzle 508 where the fuel-air mixture ignites.

For heat generation by concentrated solar thermal power, sunlight is focused on the top center of the expander 513, possibly with a glass top to allow focused sunlight to enter the chamber.

As a single turbine turning in one direction, the compressor 501 and expander 503 turns in the same clockwise direction. Gas expands in the four expander channels 509, 510, 511, 512. Gas rotates in these channels in opposite direction (anti-clockwise) of the rotation of the turbine. Pressure of gas turns the turbine clockwise. Pressure expended gas exits at the periphery of the expander.

The expander spirals are tapering by means of decreasing depths, from a larger depth of 513 near the center to a smaller depth 514 near the exit. This tapering allows slow release of pressure in spirals.

The compressor spirals may be tapered to induce a higher compression ratio. We may employ a stack of multiple compressors in stages, acting alternately as centrifugal and centripetal compressors.

In an alternative embodiment of the compressor, we can use a scroll compressor comprising two Archimedes spirals shown in FIG. 9 instead of the tapering spiral compressor. Scroll compressor allows for a high gas compression ratio due to closure of gas between the two scrolling Archimedes spirals. The scrolling however is abrasive for the contact points of the scrolling spirals.

The turbine spins around two ends 515, 516 on the axis of spinning fixed on turbine casing. We may use ball bearings, air bearings, or magnetic bearings for smooth spinning.

The electric generator 517 is shown on the periphery of the turbine-generator. We place magnets 518 on the rim of the rotor disk with opposite poles on the top and bottom of the disk as shown.

We use two toroidal solenoids 519, 520 on top and bottom of the magnets. These two solenoids can be connected in series to double voltage output. These two solenoids can act as magnetic bearing for the turbine. The permanent magnet 518 is levitated by magnetic forces from the solenoids 519, 520.

The two ends 521, 522 form the terminals of the DC generator. An external load 523 consumes the electricity generated. A load controller in may be used to control the spin velocity of the turbine. A high voltage increases spin velocity, low external load resistance increases current flow. High current flow exerts a strong torque resistance to the work provided by the heat turbine.

The heat turbine may exert work directly on an external mechanical load such as gear box of an automobile or the turboprop of an aircraft. Electricity generated can be stored via chemical batteries or supercapacitors. DC electricity generated is stored without DC to AC inversion. The DC electricity stored can be retrieved as DC to drive an electric motor. The electric motor is the same electric generator of the combined compressor-expander-generator-motor shown in FIG. 5. We may not need another motor.

Detailed Description of Air Conditioner and Dehumidifier

An implementation of an air conditioner and dehumidifier is shown in FIG. 6. The top of the FIG. indicates a combined single rotor of compressor 601 and expander 602.

We divert compressed air downward to heat exchanger 603 that yields gas heat to a water heating tank 604. Cooling of compressed air yields its moisture condensing in chamber 605 and collected through 618. Cold water enters at 616 to be heated in the water tank 604. Hot water is extracted at 617.

Cool compressed air is then further cooled by ambient air through a conduit 606 to the expander 602. Pressure expended air from the expander 602 is ducted through vent 607. The expander also serves as an air blower for delivery of cooled and dried air to rooms in a building.

The compressor is powered by motor 608 identical in structure to the generator for the heat turbine. The rotor magnet 609 is a ring with magnetic axis aligned with the rotor axis of rotation. The stator coils 610, 611 are powered by DC power source 612.

A motor control 613 controls motor voltage and current. Voltage controls spinning velocity. The compressor motor is ramped up gradually to the required speed for compression. Current controls torque force required for the compression. The compressor is hinged with bearing at 614, 615.

An alternative implementation decouples the compressor 601 from the expander. Compressed air could be delivered by thin nylon tubes to individual rooms. An expander is located in each room, delivering chill and possibly electricity generated by the spinning expander.

This alternative could be used for villages with centralized compressor and electricity generator. Power for the compressor could be derived from solar panels or from our heat turbine driven by solar heat or gas combustion. Compressed air could also be stored in large volume for evening usage. We deliver compressed air to huts by thin nylon tubes instead of power through metallic conductors. Compressed air provides chill and refrigeration to individual homes. The expander located in each home could also integrated a generator to generate low voltage DC for LED lighting, TV, and battery charging.

We describe here also a portable embodiment of the air conditioner and dehumidifier. The unit can be placed on a person's back for cooling and dehumidifying. The embodiment is similar to that of FIG. 6 without the heat exchanger 604. The top compressor-expander is placed on near the top of the paraboloid with the top surface of the paraboloid blowing cooled air onto our back. The bottom condenser collects compressed air to be cooled, dehumidified, and returned to the expander.

Detailed Description of Solar Water Desalination

FIG. 7 shows a water desalination system that employs solar power to evaporate salty water under reduced pressure. Photovoltaic power 714 may be used to drive the compressor 704.

The desalination system has water heating and steam condensation subsystem similar to that for air conditioning with dehumidifying. We compress low pressure steam instead of humid air.

A tall water column 701 has reduced pressure at water head 702. The salt water tank 703 may be made of strong glass, reinforced concrete, or ceramic material that can withstand salt water corrosion.

Above the water head and inside the water tank 703, a compressor 704 is hinged at 712, 713 and driven by a motor 705. Compressor draws in low pressure steam from inlets 715, compressing and heating that steam. Steam exiting 713 heats salty water in tank 703 for further evaporation.

Cooled steam condenses as water in the chamber 707, which can be drawn out through 708.

The circulation of salty water is as follows. Salty water can be preheated before entering water chamber 703 through inlet 710. Preheating can be achieved through heat exchange with salty brine waste. We may preheat salty water in solar water heaters with vacuumed glass water heating tubes.

A parabolic solar power collector 709 focuses solar energy onto the salty water column 703. The geometry of the collector is shown in FIG. 8. Focused sunlight heats up the salty water, which rises to the top 716 and evaporates profusely with the reduced pressure at heat of water. The water is also heated fey the condensing steam in the heat exchanger 706.

Denser brine migrates to 717, cools because of further evaporation, and sinks to the bottom. The brine waste exits at 711. Heat exchange may occur between hot brine waste and incoming salty water.

To facilitate circulation from inlet 710 to outlet 711 through the top locations 716, 717, we may partition the vertical volume of the salt water tank into sectors. The sector boundaries can also absorb focused sunlight should the salty water tank be made of transparent glass.

Salty water can also be heated by hot air exhaust from gas powered turbine. This configuration could be used for purifying contaminated water produced by tracking at oil wells. Combined heat engine and solar water desalination can also be a true life saver for ocean vessels and stranded islanders.

CONCLUDING REMARKS

There are three essential elements for human survival: air, water, and sunshine. From these three, perhaps with the assistance of gaseous fuel as backup, we derive all human comforts of cooling, heating, food, water for drinking and cleaning, and energy needed for communications, computing, and transportation. We believe the inventions described will provide these human comforts where and when needed through the paradigm of personal energy instead of centralized generation.

Acknowledgment: Jim Hussey, Ankur Ghosh, Forest Blair, and Jerry Jin of Monarch Power implemented and tested early versions of turbine. Ronan Reynolds of Monarch Power Corp 3D modeled inventions of this patent for prototyping, testing, and validating the theory presented in this patent application. Professors Daniel Bliss of Arizona State University, Y C Chiew of Rutgers University, and Falin Chen of National Taiwan University stimulated discussion of the fluid dynamics of the spiral turbine. Professor Keng Hsu of ASU 3D laser printed an early metal turbine.

I claim:

1. An energy conversion device between heat energy and motion energy via pressure change of a gas, comprising: a spiral turbine comprising:
   a plurality of coaxial disks, each of said plurality of disks having a plurality of enclosed spiral channels adapted for spiral flow of the gas between a center and a perimeter of each of said plurality of disks; wherein each of said spiral channels comprising:
   increasing radii that increase with the angle along a direction of the gas flowing in the plurality of enclosed channels; and
   a bore area that decreases logarithmically with the angle turned, such that an outer spiral channel wall has a larger area than an inner spiral channel wall: said plurality of enclosed spiral channels adapted to provide gas flows there within, the gas flows providing energy exchange between pressure energy of the gas acting on said inner and outer walls so as to produce a torque leveraged by the radius and the motion energy of said coaxial disks.

2. The energy conversion device as set forth in claim 1, wherein said spiral turbine comprises outer walls having a tapering exponential spiral shape.

3. The conversion device as set forth in claim 1, wherein said spiral turbine is adapted to turn in a forward direction, and the energy conversion device further comprising: a centripetal gas compressor in fluid communication with said spiral turbine, said centripetal gas adapted to compresses air inward by said spiral turbine; a heat exchanger thermally coupled to said centripetal gas compressor, said heat exchanger adapted to add or subtract heat from the compressed air; and an electrical generator-with rotor coupled to said spiral turbine, said electrical generator adapted to exchange motion energy with electric energy.

4. The energy conversion device as set forth in claim 3, wherein said centripetal gas compressor turns in the forward direction.

5. The energy conversion device as set forth in claim 3, wherein said centripetal gas compressor turns in a reverse direction of the forward direction.

6. The enemy conversion device as set forth in claim 3, wherein said heat exchanger adds heat to the compressed air and is adapted to drive said spiral turbine to generate electricity through said electrical generator.

7. The energy conversion device as set forth in claim 3, wherein said heat exchanger is adapted to subtract heat from the compressed air, and output a gas from said spiral turbine.

8. The energy conversion device as set forth in claim 1, wherein said plurality of coaxial disks include an outer wall having a tapering exponential spirals shape, and coaxial stacking of said plurality of coaxial disks is arranged in stages utilizing both said tapering exponential spirals and said plurality of enclosed spiral channels situated in between said tapering spirals and exponential spirals;

wherein said tapering exponential spirals and said plurality of enclosed spiral channels are connected near the center or perimeter of said coaxial disks.

9. The energy conversion device as set forth in claim 1 further comprising: a column of water thermally coupled to said energy conversion device, said column of water adapted to evaporate water under reduced pressure; and said energy conversion device further comprising:

a conic surface positioned relative said energy conversion device so as to reflect light from an external source onto the column of water;

a second spiral turbine in fluid communication with said column of water, said second spiral turbine adapted to receive evaporated water vapor from said column of water and convert the evaporated water vapor into water; and a water condensation column coupled to said second spiral turbine.

10. The energy conversion device as set forth in claim 9 wherein said spiral turbine is adapted to turn in a forward direction, and said second spiral turbine is adapted to turn in in a direction parallel to said forward direction when converting the evaporated water vapor into water.

11. The energy conversion device as set forth in claim 9 wherein said water condensation column adapted to collect water from said second spiral turbine and return a heat of condensation back to the column of water.

\* \* \* \* \*